(12) United States Patent
Morishima et al.

(10) Patent No.: US 7,148,862 B2
(45) Date of Patent: Dec. 12, 2006

(54) STEREOSCOPIC IMAGE DISPLAY APPARATUS

(75) Inventors: Hideki Morishima, Tochigi (JP);
Naosato Taniguchi, Saitama (JP);
Toshiyuki Sudo, Tochigi (JP); Hiroshi Nishihara, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 457 days.

(21) Appl. No.: 10/439,796

(22) Filed: May 16, 2003

(65) Prior Publication Data

US 2003/0214497 A1 Nov. 20, 2003

(30) Foreign Application Priority Data

May 17, 2002 (JP) .............................. 2002-183627
May 9, 2003 (JP) .............................. 2003-131709

(51) Int. Cl.
*G09G 3/00* (2006.01)
*G09G 5/00* (2006.01)

(52) U.S. Cl. .............................. 345/32; 345/6; 348/59; 359/463

(58) Field of Classification Search ................. 345/32, 345/6; 348/51, 59; 359/462, 463, 621, 623
See application file for complete search history.

(56) References Cited

U.S. PATENT DOCUMENTS 6,061,179 A * 5/2000 Inoguchi et al. ............ 359/464

2002/0154215 A1* 10/2002 Schechterman et al. ...... 348/51

FOREIGN PATENT DOCUMENTS

EP 1248473 A1 9/2002

* cited by examiner

*Primary Examiner*—Dennis-Doon Chow
(74) *Attorney, Agent, or Firm*—Morgan & Finnegan LLP

(57) ABSTRACT

The present invention discloses a stereoscopic image display apparatus for which an image display unit can be freely selected, and in which crosstalk is suppressed even if a transmissive image display unit is used. The stereoscopic image display apparatus according to the present invention includes an image display unit in which pixel groups including pixels that display images corresponding to observation positions respectively are arranged cyclically; a lenticular array which substantially condenses light rays from the respective pixels at the predetermined observation positions and which is constituted by a plurality of horizontal lens lines arranged vertically, each of which is formed by a plurality of cylindrical lenses horizontally arranged at a predetermined cycle. And the apparatus includes a limiting member that limits light rays so that rays from a predetermined horizontal pixel lines may reach only the horizontal lens line having the same horizontal positions of cylindrical lenses.

12 Claims, 28 Drawing Sheets

FIG.2

| D4 | D5 | D6 | D7 | D8 | D9 | D1 | D2 | D3 | D4 | D5 | D6 | D7 | D8 | D9 | D1 | D2 | D3 |
|----|----|----|----|----|----|----|----|----|----|----|----|----|----|----|----|----|----|
| D1 | D2 | D3 | D4 | D5 | D6 | D7 | D8 | D9 | D1 | D2 | D3 | D4 | D5 | D6 | D7 | D8 | D9 |
| D7 | D8 | D9 | D1 | D2 | D3 | D4 | D5 | D6 | D7 | D8 | D9 | D1 | D2 | D3 | D4 | D5 | D6 |
| D4 | D5 | D6 | D7 | D8 | D9 | D1 | D2 | D3 | D4 | D5 | D6 | D7 | D8 | D9 | D1 | D2 | D3 |
| D1 | D2 | D3 | D4 | D5 | D6 | D7 | D8 | D9 | D1 | D2 | D3 | D4 | D5 | D6 | D7 | D8 | D9 |
| D7 | D8 | D9 | D1 | D2 | D3 | D4 | D5 | D6 | D7 | D8 | D9 | D1 | D2 | D3 | D4 | D5 | D6 |
| D4 | D5 | D6 | D7 | D8 | D9 | D1 | D2 | D3 | D4 | D5 | D6 | D7 | D8 | D9 | D1 | D2 | D3 |

| Id1 | Id2 | Id3 | Id1 | Id2 | Id3 | Id1 |
|---|---|---|---|---|---|---|
| D6 | D4 | D9 | D6 | D4 | D9 | D6 |
| D5 | D3 | D8 | D5 | D3 | D8 | D5 |
| D4 | D2 | D7 | D4 | D2 | D7 | D4 |
| D3 | (D1) | D6 | D3 | (D1) | D6 | D3 |
| D2 | D9 | D5 | D2 | D9 | D5 | D2 |
| (D1) | D8 | D4 | (D1) | D8 | D4 | (D1) |
| D9 | D7 | D3 | D9 | D7 | D3 | D9 |
| D8 | D6 | D2 | D8 | D6 | D2 | D8 |
| D7 | D5 | (D1) | D7 | D5 | (D1) | D7 |
| D6 | D4 | D9 | D6 | D4 | D9 | D6 |
| D5 | D3 | D8 | D5 | D3 | D8 | D5 |
| D4 | D2 | D7 | D4 | D2 | D7 | D4 |
| D3 | (D1) | D6 | D3 | (D1) | D6 | D3 |
| D2 | D9 | D5 | D2 | D9 | D5 | D2 |
| (D1) | D8 | D4 | (D1) | D8 | D4 | (D1) |
| D9 | D7 | D3 | D9 | D7 | D3 | D9 |
| D8 | D6 | D2 | D8 | D6 | D2 | D8 |
| D7 | D5 | (D1) | D7 | D5 | (D1) | D7 |

FIG.13

| D8 | D9 | D7 | D8 | D9 | D7 | D8 | D9 |
| --- | --- | --- | --- | --- | --- | --- | --- |
| D5 | D6 | D4 | D5 | D6 | D4 | D5 | D6 |
| D2 | D3 | D1 | D2 | D3 | D1 | D2 | D3 |
| D8 | D9 | D7 | D8 | D9 | D7 | D8 | D9 |
| D5 | D6 | D4 | D5 | D6 | D4 | D5 | D6 |
| D2 | D3 | D1 | D2 | D3 | D1 | D2 | D3 |
| D8 | D9 | D7 | D8 | D9 | D7 | D8 | D9 |
| D5 | D6 | D4 | D5 | D6 | D4 | D5 | D6 |
| D2 | D3 | D1 | D2 | D3 | D1 | D2 | D3 |
| D8 | D9 | D7 | D8 | D9 | D7 | D8 | D9 |
| D5 | D6 | D4 | D5 | D6 | D4 | D5 | D6 |
| D2 | D3 | D1 | D2 | D3 | D1 | D2 | D3 |
| D8 | D9 | D7 | D8 | D9 | D7 | D8 | D9 |
| D5 | D6 | D4 | D5 | D6 | D4 | D5 | D6 |
| D2 | D3 | D1 | D2 | D3 | D1 | D2 | D3 |
| D8 | D9 | D7 | D8 | D9 | D7 | D8 | D9 |
| D5 | D6 | D4 | D5 | D6 | D4 | D5 | D6 |
| D2 | D3 | D1 | D2 | D3 | D1 | D2 | D3 |

FIG.23

| Id1 | Id2 | Id1 | Id2 | Id1 | Id2 | Id1 | Id2 |
|---|---|---|---|---|---|---|---|
| D1 | D5 | D1 | D5 | D1 | D5 | D1 | D5 |
| D2 | D6 | D2 | D6 | D2 | D6 | D2 | D6 |
| D3 | D7 | D3 | D7 | D3 | D7 | D3 | D7 |
| D4 | D8 | D4 | D8 | D4 | D8 | D4 | D8 |
| D5 | D1 | D5 | D1 | D5 | D1 | D5 | D1 |
| D6 | D2 | D6 | D2 | D6 | D2 | D6 | D2 |
| D7 | D3 | D7 | D3 | D7 | D3 | D7 | D3 |
| D8 | D4 | D8 | D4 | D8 | D4 | D8 | D4 |
| D1 | D5 | D1 | D5 | D1 | D5 | D1 | D5 |
| D2 | D6 | D2 | D6 | D2 | D6 | D2 | D6 |
| D3 | D7 | D3 | D7 | D3 | D7 | D3 | D7 |
| D4 | D8 | D4 | D8 | D4 | D8 | D4 | D8 |
| D5 | D1 | D5 | D1 | D5 | D1 | D5 | D1 |
| D6 | D2 | D6 | D2 | D6 | D2 | D6 | D2 |
| D7 | D3 | D7 | D3 | D7 | D3 | D7 | D3 |
| D8 | D4 | D8 | D4 | D8 | D4 | D8 | D4 |
| D1 | D5 | D1 | D5 | D1 | D5 | D1 | D5 |
| D2 | D6 | D2 | D6 | D2 | D6 | D2 | D6 |

FIG.27

| | | | | | | | | |
|---|---|---|---|---|---|---|---|---|
| D6 | D9 | D3 | D6 | D9 | D3 | D6 | D9 | D3 |
| D5 | D8 | D2 | D5 | D8 | D2 | D5 | D8 | D2 |
| D4 | D7 | D1 | D4 | D7 | D1 | D4 | D7 | D1 |
| D3 | D6 | D9 | D3 | D6 | D9 | D3 | D6 | D9 |
| D2 | D5 | D8 | D2 | D5 | D8 | D2 | D5 | D8 |
| D1 | D4 | D7 | D1 | D4 | D7 | D1 | D4 | D7 |
| D9 | D3 | D6 | D9 | D3 | D6 | D9 | D3 | D6 |
| D8 | D2 | D5 | D8 | D2 | D5 | D8 | D2 | D5 |
| D7 | D1 | D4 | D7 | D1 | D4 | D7 | D1 | D4 |
| D6 | D9 | D3 | D6 | D9 | D3 | D6 | D9 | D3 |
| D5 | D8 | D2 | D5 | D8 | D2 | D5 | D8 | D2 |
| D4 | D7 | D1 | D4 | D7 | D1 | D4 | D7 | D1 |
| D3 | D6 | D9 | D3 | D6 | D9 | D3 | D6 | D9 |
| D2 | D5 | D8 | D2 | D5 | D8 | D2 | D5 | D8 |
| D1 | D4 | D7 | D1 | D4 | D7 | D1 | D4 | D7 |
| D9 | D3 | D6 | D9 | D3 | D6 | D9 | D3 | D6 |
| D8 | D2 | D5 | D8 | D2 | D5 | D8 | D2 | D5 |
| D7 | D1 | D4 | D7 | D1 | D4 | D7 | D1 | D4 |

STEREOSCOPIC IMAGE DISPLAY APPARATUS

BACKGROUND OF THE INVENTION

1. Field of the Invention

The present invention relates to a stereoscopic image display apparatus, and in particular, to a stereoscopic image display apparatus suitable for performing stereoscopic display in a TV set, a VCR, a computer monitor, a game machine, and the like.

2. Description of Related Art

As a stereoscopic image display apparatus, there is, for example, a so-called multiple lens system proposed in the published European Patent Application No. 1 248 473 (A1).

This stereoscopic image display apparatus expresses stereoscopic effects by displaying original images of a certain observation object, corresponding to different observation positions, on an image display unit, and leading light from the image display unit so as to be able to observe these original images from the observation positions (viewpoints) respectively.

Nevertheless, this conventional stereoscopic image display apparatus has the following defects to be improved.

(1) Since it is necessary to use a transmissive display as an image display unit that displays the original images, degrees of freedom of display unit selection are lowered.

In addition, though LCDs are widely used now as transmissive display units, recent LCDs tend to largely scatter illumination light when the illumination light penetrates each of the LCDs because pixel structure is made fine so as to improve a viewing angle characteristic. Therefore, so as to use such an LCD for a multiviewpoint stereoscopic image display apparatus, it is necessary to specify a direction of display light so that the display light may reach only the observation positions, corresponding to the respective pixels, in a location where the display light from respective pixels is apart by desired observation distance.

At this point, the above-described conventional stereoscopic image display apparatus has the structure that gives directionality to the illumination light that illuminates pixels of the transmissive display unit. Nevertheless, there is a problem that, when the diffusion of the LCD increases, there arises a problem that, since the LCD scatters the illumination light even if the directionality is given to the illumination light, arrival positions of the illumination light in the observation plane shift, and hence, a stereoscopic image cannot be properly observed because so-called crosstalk arises.

(2) In the structure of the conventional stereoscopic image display apparatus, when performing color display, there is no position where it is possible to observe an image in colors since colors are separated on an observation plane by the color filter arrangement of the LCD.

(3) Moreover, in the stereoscopic image display apparatus proposed in the above-described publication, since components, proceeding in directions other than an observation position, in the illumination light from a pixel are interrupted by using a mask, a light efficiency is low.

SUMMARY OF THE INVENTION

The present invention aims to provide a stereoscopic image display apparatus for which an image display unit can be freely selected in which crosstalk does not arise even if a transmissive image display unit with strong scattering is used, and whose light efficiency is also high.

Moreover, the present invention also aims to provide a multiviewpoint stereoscopic image display apparatus to be able to suppress color separation when color display is performed.

To achieve the above-described objects, the stereoscopic image display apparatus according to the present invention includes an image display unit in which a plurality of horizontal pixel lines is provided a vertical direction, and pixel groups including pixels that display images corresponding to a plurality of observation positions respectively are arranged cyclically; a lenticular array which substantially condenses rays of light from the respective pixels at the predetermined observation positions in a horizontal plane, and which is constituted by a plurality of horizontal lens lines which are arranged in the vertical direction, each of the horizontal lens lines is formed by a plurality of cylindrical lenses arranged in the horizontal direction at a predetermined cycle corresponding to each of the pixel groups. And the apparatus includes a limiting member that limits rays of light so that rays of light from a predetermined horizontal pixel line may reach only the horizontal lens lines having the cylindrical lenses whose horizontal positions are the same among the plurality of horizontal lens lines. Rays of light from the pixels that display images corresponding to the respective observation positions reach predetermined observation positions through the lenticular array and the limiting member.

Features of the stereoscopic image display apparatus according to the present invention will become clear by the following description of specific embodiments with referring to drawings.

BRIEF DESCRIPTION OF THE DRAWINGS

FIG. 2 is a diagram for explaining the distribution of pixels in a display unit of the stereoscopic image display apparatus to each viewpoint.

FIGS. 10(A) and 10(B) are front views showing distribution methods of subpixels of a color display unit in a stereoscopic image display apparatus, which is Embodiment 2 of the present invention, to respective viewpoints.

FIG. 11 is a front view showing a distribution method of subpixels of a color display unit in a stereoscopic image display apparatus, which is Embodiment 3 of the present invention, to respective viewpoints.

FIG. 13 is a front view showing a distribution method of pixels of a display unit in a stereoscopic image display apparatus, which is Embodiment 4 of the present invention, to respective viewpoints.

FIG. 23 is a diagram for explaining the distribution of pixels in a display unit of the stereoscopic image display apparatus according to Embodiment 6.

FIG. 27 is a diagram for explaining the distribution of pixels in a display unit of the stereoscopic image display apparatus according to Embodiment 7.

DETAILED DESCRIPTION OF THE PREFERRED EMBODIMENTS

Embodiment 1

Figure 1:
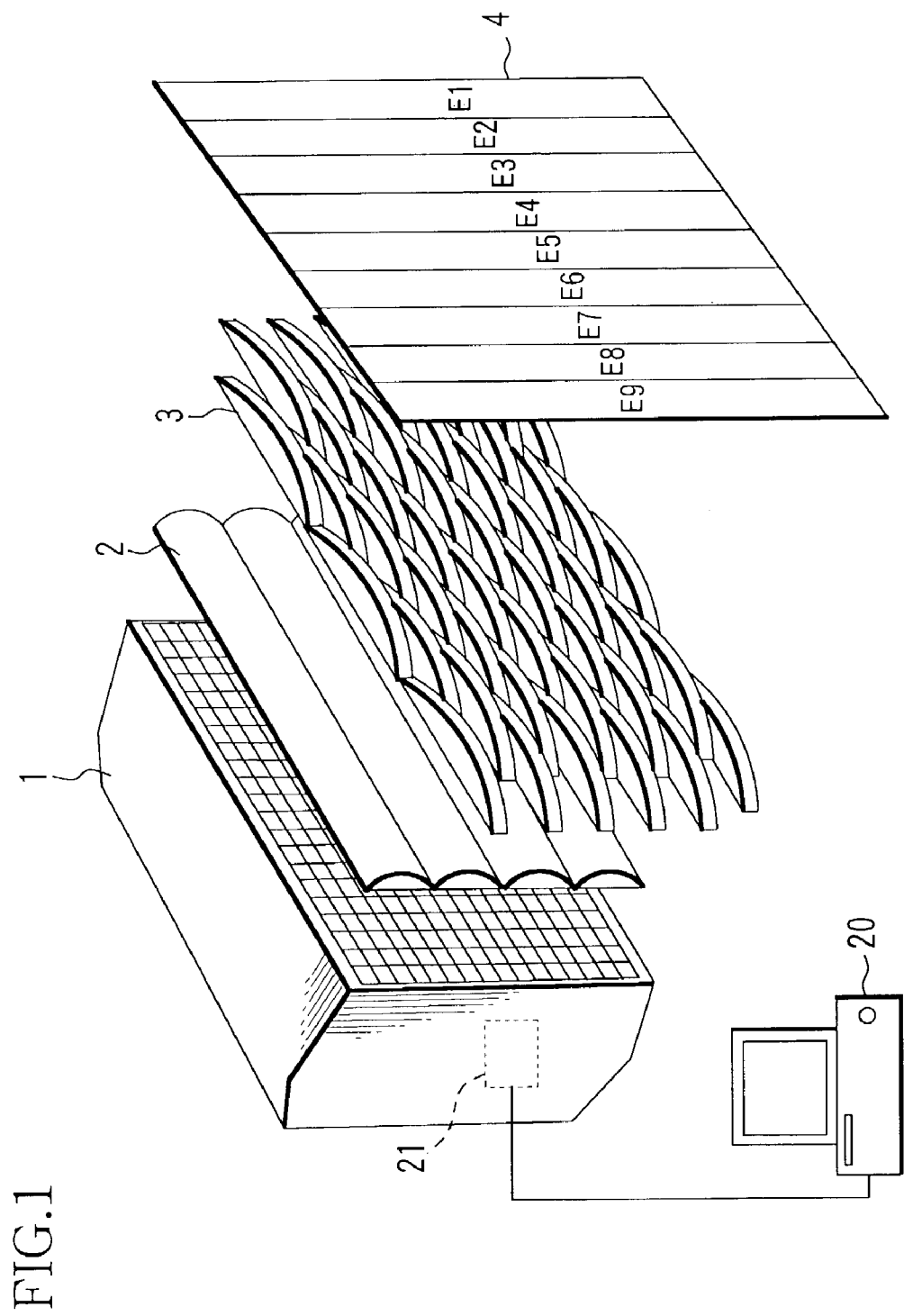
FIG. 1 is a perspective view showing the structure of a stereoscopic image display apparatus that is Embodiment 1 of the present invention.

FIG. 1 shows the structure of a stereoscopic image display apparatus that is Embodiment 1 of the present invention. In the stereoscopic image display apparatus of this embodiment, the number of observation positions (hereafter, these are called viewpoints) is r, and the resolution is not biased in any direction, by arranging pixels in a matrix (r=p rows×q columns) on a display unit and distributing pixels, displaying respective viewpoint images, vertically and horizontally.

The stereoscopic image display apparatus in this embodiment has nine viewpoints composed of p=3, q=3, and r=9. This stereoscopic image display apparatus comprises a display unit (image display unit) 1, a horizontal lenticular lens 2 arranged in the front side (side of an observation area 4) of the display unit 1, and a shift lenticular array 3 arranged in the front side of the horizontal lenticular lens 2.

A transmissive image display device is used as the display unit 1 in this embodiment, but other type image display device can be freely selected without limiting thereto. For example, a reflective or self-light-emitting display device can be also used.

Respective viewpoints E1 to E9 in the observation area 4, line up from the right to the left in this order. Each viewpoint is not just a point but is an area having a certain horizontal width.

FIG. 2 shows how original images corresponding to the nine viewpoints (hereafter, these are called viewpoint images) are displayed in respective pixels of the display unit 1. Reference symbols D1 to D9 assigned to respective pixels shown by rectangular frames in the drawing show respective viewpoint images, that correspond to viewpoints E1 to E9. For example, a pixel D1 displays a viewpoint image corresponding to the viewpoint E1, and a pixel D2 displays a viewpoint image corresponding to the viewpoint E2 respectively.

Here, image information to display respective viewpoint images in the display unit 1 is supplied from an image information supplying apparatus 20 such as a personal computer, a VCR, and a DVD drive to a display unit drive circuit 21 of the stereoscopic image display apparatus. The display unit drive circuit 21 drives the display unit 1 on the basis of the inputted image information, and nine viewpoint images are synthetically displayed in the display unit 1 by pixels different from each other.

In FIG. 2, a pixel arrangement method in the display unit 1 is to repeatedly arrange pixels from D1 to D9 corresponding to nine (=r) viewpoints in each horizontal line of pixels cyclically, and to make the arrangement order (order of denoting which pixel displays which viewpoint image) of pixels shifted by three (=q) pixels every pixel line in the horizontal direction. In this case, pixel arrangement order becomes the same every three (=p) horizontal pixel lines.

A shift lenticular array 3 is constituted by arranging cylindrical lens portions, each of which has an optical power in the horizontal direction but does not have an optical power in the vertical direction, horizontally and vertically in a predetermined pattern.

In addition, in FIG. 1, the shift lenticular array 3 is shown with being considerably expanded than actual size to make its shape easily understood. Furthermore, in other drawings, the size and positional relation to the shift lenticular array 3 and display unit 1 (pixels) are made to differ from actual ones so as to make optical actions etc. comprehensible. This is the same also about the horizontal lenticular lens 2 explained later in detail.

Figure 3:
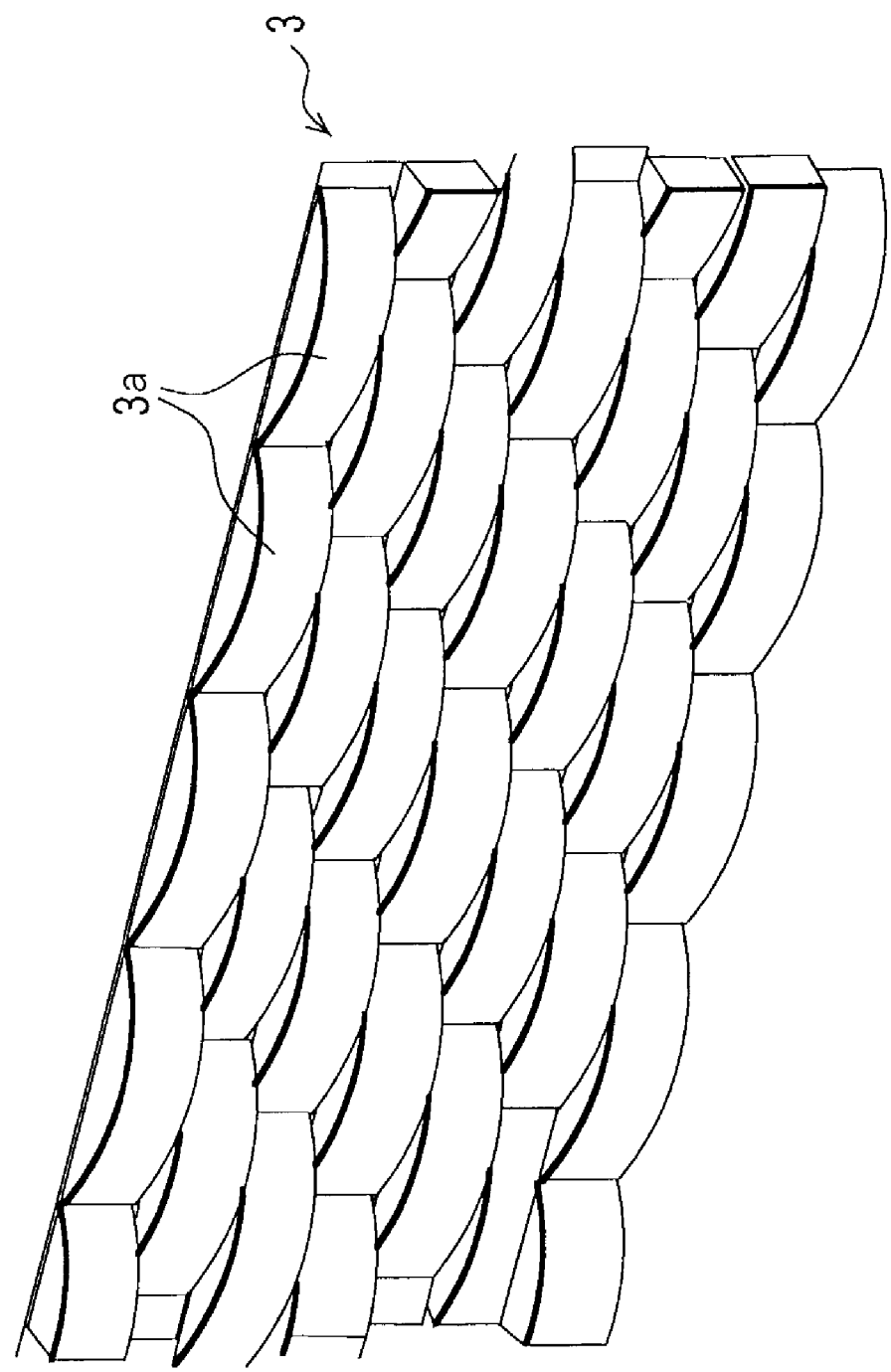
FIG. 3 is a perspective view showing a shift lenticular array in the stereoscopic image display apparatus.

By using FIG. 3, it will be explained how cylindrical lens portions 3a constituting the shift lenticular array 3 are arranged.

Though this will be explained later in detail, each horizontal line (hereafter, this is called a horizontal lens line) of the cylindrical lens portions 3a in the shift lenticular array 3 is provided in correspondence to each of the horizontal pixel lines of the display unit 1. Moreover, each of the cylindrical lens portions 3a constituting each horizontal lens line is provided in correspondence to predetermined consecutive pixels (pixel group) of a corresponding horizontal pixel line in the display unit 1.

In this embodiment, each of the cylindrical lens portions 3a has horizontal width corresponding to horizontal width of nine (=r) pixels (pixel group), and this shift lenticular array 3 is constituted by arranging these cylindrical lens portions 3a horizontally and vertically in a predetermined pattern.

In addition, each of the cylindrical lens portions 3a constituting the shift lenticular array 3 has an optical power in the horizontal direction, and does not have an optical power in the vertical direction. Then, the horizontal optical power converts divergent rays of light emerged from one point of the display unit 1 into a parallel rays of light, and a horizontal curvature of each cylindrical lens portion 3a is set so as to give such a horizontal optical power.

Next, a principle of nine-viewpoint stereoscopic image display will be explained by using FIG. 4.

The cylindrical lens portions 2a constituting a horizontal lenticular lens 2 are provided corresponding to p(=3) lines of horizontal pixel lines consecutively arranged in the vertical direction on the display unit 1. In FIG. 4, only a cylindrical lens portion 2a corresponding to three horizontal pixel lines is shown.

Rays of light from horizontal pixel lines ld1, ld2, and ld3 adjacent to each other in the vertical direction on the display unit 1 are formed image on horizontal lens lines lm1, lm2, and lm3 which are adjacent to each other in the vertical direction on the shift lenticular array 3 by the vertical optical power of this horizontal cylindrical lens 2 (cylindrical lens portion 2a).

Rays of display light emerged from pixels D1 to D9 of the horizontal pixel line ld1 are condensed in the horizontal lens line lm1 on the shift lenticular array 3 by the optical power of the horizontal lenticular lens 2. Then, the rays of display light are oriented in the direction of each viewpoint in the horizontal direction by the optical power of a cylindrical lens portion 31 on this horizontal lens line lm1, and reach the observation area 4.

At this time, the rays of display light emerged from the pixels D1 to D9 reach the viewpoints E1 to E9 in the observation area 4 respectively. The positional relation among the pixels D1 to D9, cylindrical lens portion 31, and viewpoints E1 to E9 is the same as the relation in a nine-viewpoint multiviewpoint stereoscopic display with general vertical lenticular lenses.

Figure 4:
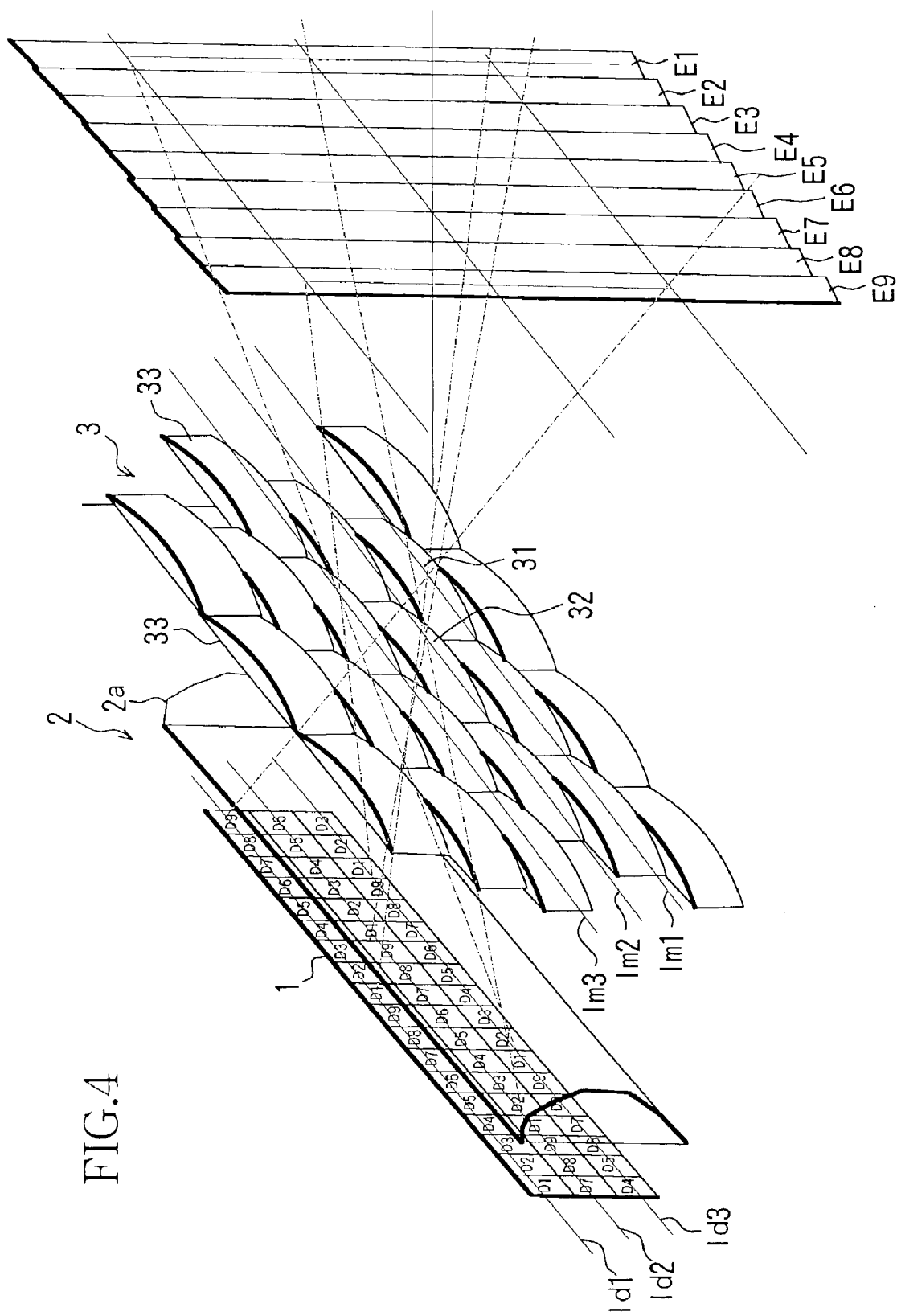
FIG. 4 is an explanatory diagram of image display light in the stereoscopic image display apparatus.

Viewpoint images that the pixels on the horizontal pixel line ld2 display are for three (=q) viewpoints as shown in FIGS. 2 and 4. The pixel arrangement order on this horizontal pixel line ld2 horizontally shifts by three to the pixel arrangement order on the horizontal pixel line ld1.

Rays of display light emerged from pixels D1 to D9 of the horizontal pixel line ld2 are condensed in the horizontal lens line lm2 on the shift lenticular array 3 by the optical power of the horizontal lenticular lens 2. Then, the rays of display light are oriented in the direction of each viewpoint in the horizontal direction by the optical power of a cylindrical lens portion 32 on the horizontal lens line lm2, and reach the observation area 4.

A position of a horizontal center of the cylindrical lens portion 32 shifts by a predetermined amount, explained later in detail, to a horizontal center of the cylindrical lens portion 31. Hence, the rays of display light emerged from the pixels D1 to D9 on the horizontal pixel line ld2 reach viewpoint positions E1 to E9 respectively through the cylindrical lens portion 32, but do not reach other viewpoint positions.

Similarly, viewpoint images that the pixels on the horizontal pixel line ld3 display also are for three (=q) viewpoints. The pixel arrangement order on this horizontal pixel line ld3 horizontally shifts by three to the pixel arrangement order on the horizontal pixel line ld2.

Rays of display light rays emerged from pixels D1 to D9 of the horizontal pixel line ld3 are condensed in the horizontal lens line lm3 on the shift lenticular array 3 by the optical power of the horizontal lenticular lens 2. Then, the rays of display light are oriented in the direction of each viewpoint in the horizontal direction by the optical power of a cylindrical lens portion 33 on the horizontal lens line lm3, and reach the observation area 4.

A position of a horizontal center of the cylindrical lens portion 33 shifts by a predetermined amount to a horizontal center of the cylindrical lens portion 32. Hence, the rays of display light emerged from the pixels D1 to D9 on the horizontal pixel line ld3 reach viewpoint positions E1 to E9 respectively through the cylindrical lens portion 33.

Figure 5:
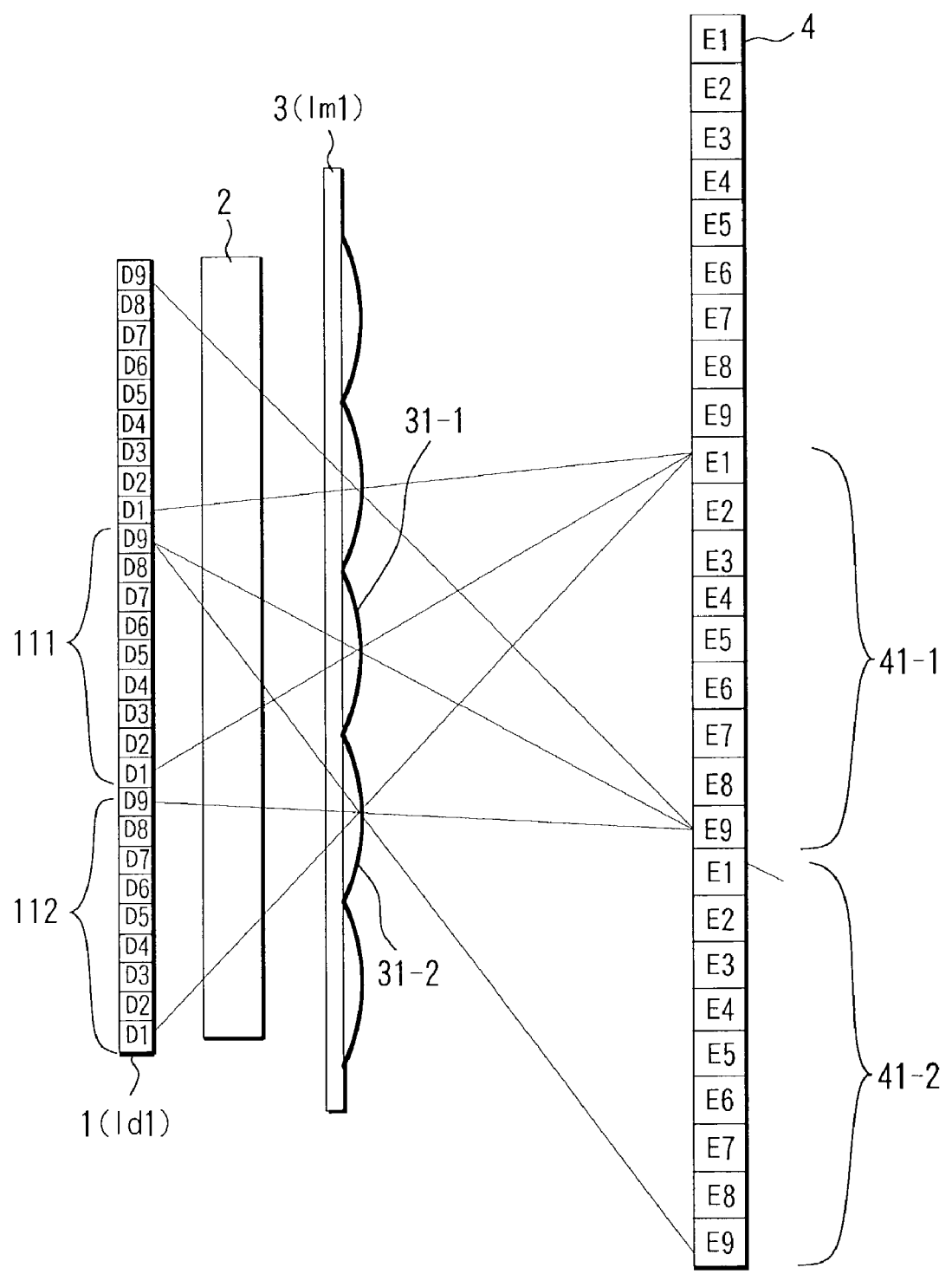
FIG. 5 is a horizontal section of the stereoscopic image display apparatus.
Figure 6:
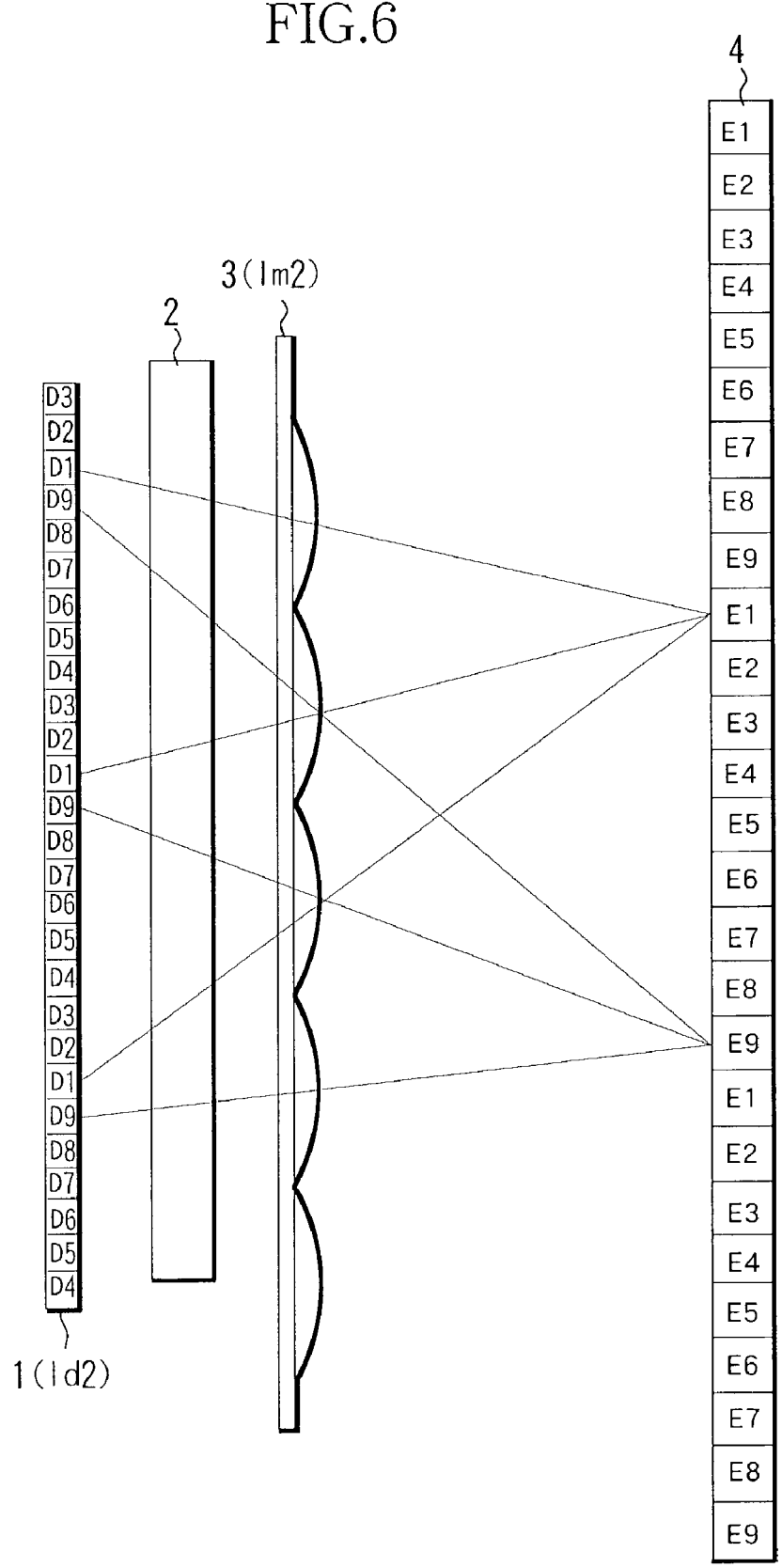
FIG. 6 is a horizontal section of the stereoscopic image display apparatus.
Figure 7:
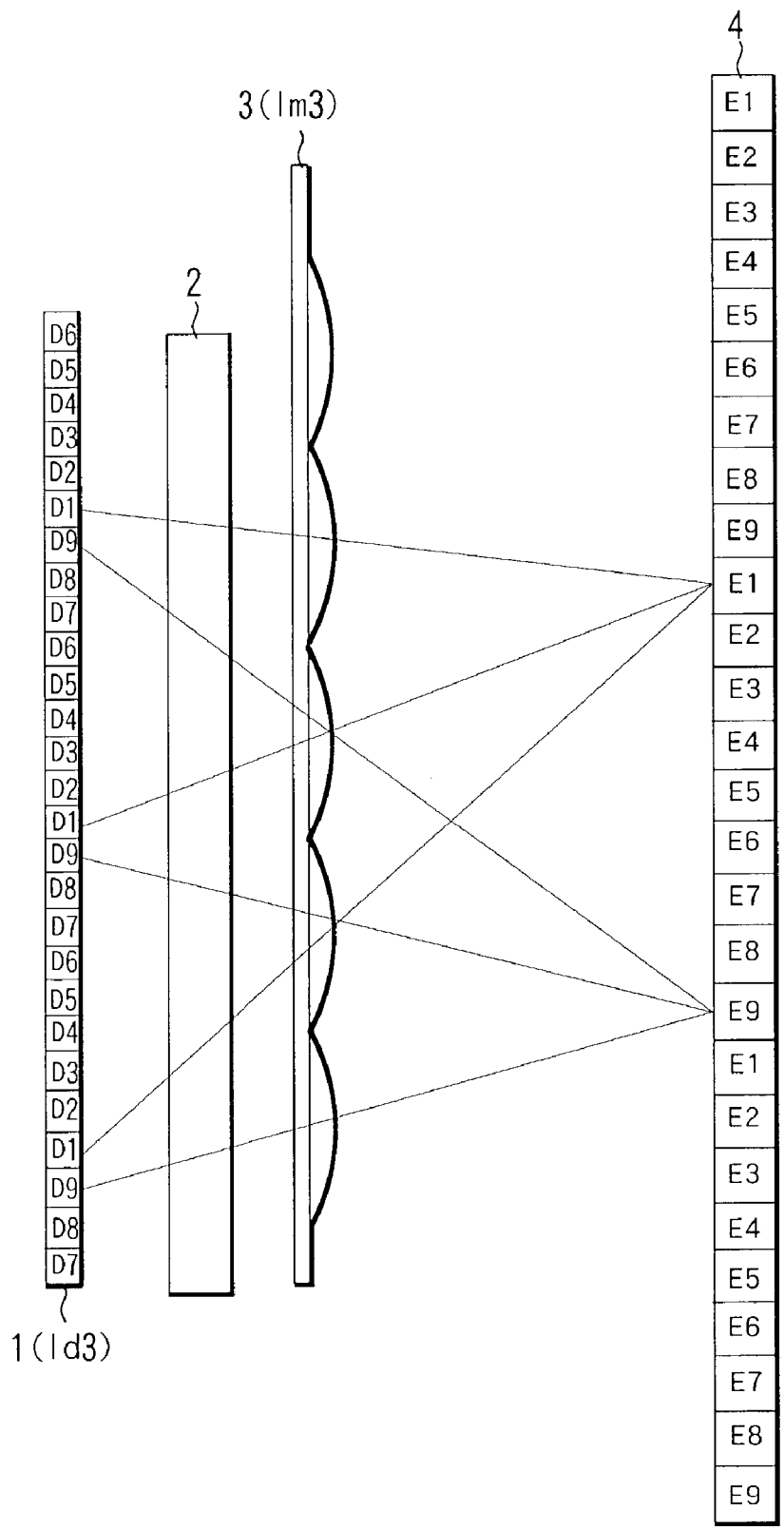
FIG. 7 is a horizontal section of the stereoscopic image display apparatus.

FIGS. 5 to 7 show optical actions in the horizontal direction for stereoscopic image display in this embodiment. FIGS. 5 to 7 show sections respectively by horizontal planes that pass the horizontal pixel line ld1 and horizontal lens line lm1, the horizontal pixel line ld2 and horizontal lens line lm2, and the horizontal pixel lines ld3 and horizontal lens line lm3 respectively in FIGS. 2 to 4.

This embodiment acts similarly to a usual nine-viewpoint lenticular type stereoscopic display in each of these sections.

In FIG. 5, rays of display light emerged from pixels D1 to D9 in a consecutive pixel area 111 on the display unit 1 reach viewpoints E1 to E9 (41-1), corresponding respectively, on the observation area 4 through a cylindrical lens portion 31-1 of the shift lenticular array 3, but does not reach other non-corresponding observation positions.

Similarly, rays of display light emerged from pixels D1 to D9 in a consecutive pixel area 112 on the display unit 1 reach viewpoints E1 to E9, corresponding respectively, on the observation area 4 through a cylindrical lens portion 31-2 of the shift lenticular array 3, but does not reach other non-corresponding observation positions.

Rays of display light that are emerged from each pixel in the area 111 of the display unit 1 and pass a cylindrical lens portion except the cylindrical lens portion 31-1 of the shift lenticular array 3, for instance, a cylindrical lens portion 31-2 and reach viewpoints E1 to E9 in a range different from a range 41-2 on the observation area 4. Here, the arrangement of the viewpoints E1 to E9 in the range 41-2 is the same as that of observation positions E1 to E9 in the range 41-1.

In addition, the rays of display light that are emerged from each pixel in the area 111 of the display unit 1 and pass a cylindrical lens portion except the cylindrical lens portions 31-1 and 31-2 reach observation positions E1 to E9, having the same arrangement, in a range different from the two ranges 41-1 and 41-2 on the observation area 4.

In this manner, rays of light emerged from the respective pixels D1 to D9 in the area 111 on the display unit 1 reach viewpoints E1 to E9 within a range other than the range 41-1 while reaching viewpoints E1 to E9 within the range 41-1 in the observation area 4 as described above. Thus, in consequence, a nine-viewpoint stereoscopic image can be displayed since only the rays of light from the respective pixels D1 to D9 of the display unit 1 reach viewpoints E1 to E9 on the observation area 4 respectively and viewpoints E1 to E9 are repeatedly formed on the observation area 4.

Similarly, also in the sections that pass the horizontal pixel lines ld2 and ld3 on the display unit 1, and the horizontal lens lines lm2 and lm3 on the shift lenticular array 3, which are shown in FIGS. 6 and 7, the rays of light from the respective pixels D1 to D9 of the display unit 1 reach only the corresponding viewpoints E1 to E9 on the observation area 4 respectively. Similarly to the state in the section explained in FIG. 5, viewpoints E1 to E9 are formed on the observation area 4 repeatedly, and a nine-viewpoint stereoscopic image can be displayed.

Figure 8:
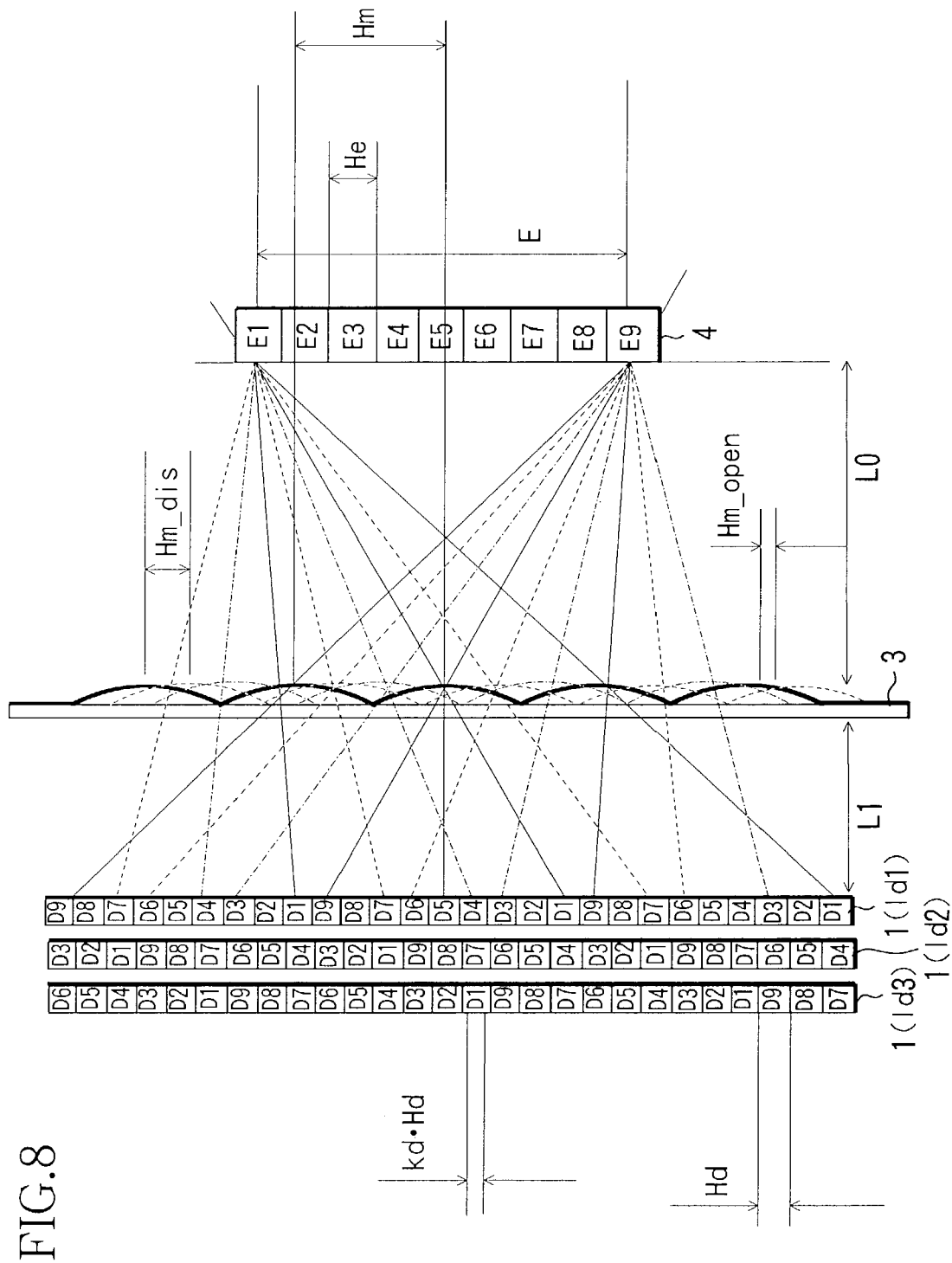
FIG. 8 is a horizontal section of the stereoscopic image display apparatus.

FIG. 8 is an explanatory diagram showing the sections shown in FIGS. 5 to 7 with being stacked, and three types of horizontal pixel lines ld1, ld2, and ld3 of the display unit 1 are shown with being mutually shifted horizontally. However, the horizontal lenticular lens 2 is omitted in FIG. 8.

Here, relational expressions among horizontal parameters concerning stereoscopic image display will be explained by using FIGS. 5 to 8. In addition, the number of viewpoints is defined to be generalized as r=p·q in these relational expressions.

When a horizontal pixel pitch of the display unit 1 is Hd, a horizontal pitch between cylindrical lens portions constituting one horizontal line in the shift lenticular array 3 is Hm, a horizontal shift amount of positions of a cylindrical lens portion each time a horizontal line of the shift lenticular lens array is shifted by one line in the vertical direction is Hm_dis, air conversion distance between the display unit 1 and shift lenticular lens array 3 is L1, air conversion distance between the shift lenticular lens array 3 and the observation area 4 is L0, separation width in the observation area 4 corresponding to pixels D1 to Dr (D9 in the drawing) is E, each horizontal width of observation positions (viewpoints) E1 to Er (E9 in the drawing) is He, and a refractive index and a horizontal curvature radius of the cylindrical lens portions constituting the shift lenticular array 3 are n and rh respectively, the following relational expressions stand up by using fundamental geometrical relations and a lens principle.

| $(r-1) \cdot Hd:(r-1) \cdot He = L1:L0$ | (h1) |
|---|---|
| $r \cdot Hd:Hm = L1 + L0:L0$ | (h2) |
| $He \cdot (r-1) = E$ | (h3) |
| $Hm\_dis:Hd \cdot q = L0:L1 + L0$ | (h4) |
| $rh = (1-n) \cdot L1$ | (h5) |

When independent variables are L0, Hd, E, p, q, and r (=p·q), solutions of these relational expressions are as follows:

$$L1 = Hd \cdot L0 \cdot (r-1)/E$$

$$He = E/(r-1)$$

$$Hm = r \cdot Hd \cdot E/((r-1) \cdot Hd + E)$$

$$Hm\_dis = E \cdot Hd \cdot q/((r-1) \cdot Hd + E)$$

$$rh = (1-n)Hd \cdot L0 \cdot (r-1)/E$$

For example, when Hd=0.3 mm, L0=600 mm, p=3, q=3, r=9, E=200 mm, and n=1.51, then, L1=7.2 mm, He=25 mm, Hm=2.668, Hm_dis=0.889 mm, and rh=3.672 mm.

Next, the optical action of the horizontal lenticular lens 2 in this embodiment will be explained. This apparatus in this embodiment leads rays of display light from each horizontal pixel line of the display unit 1 to a corresponding horizontal lens line in the shift lenticular array 3, and leads the rays of light from pixels arranged in a matrix by a cylindrical lens portion whose arrangement shifts every horizontal lens line of the shift lenticular array 3 to each viewpoint that is horizontally arranged in a vertically-striped shape on the observation area 4.

Hence, when the rays of display light emerged from each horizontal pixel line leaks into a horizontal lens line on the shift lenticular array 3 that does not correspond, a crosstalk arises. The horizontal lenticular lens 2 operates as a member to suppress this.

Figure 9:
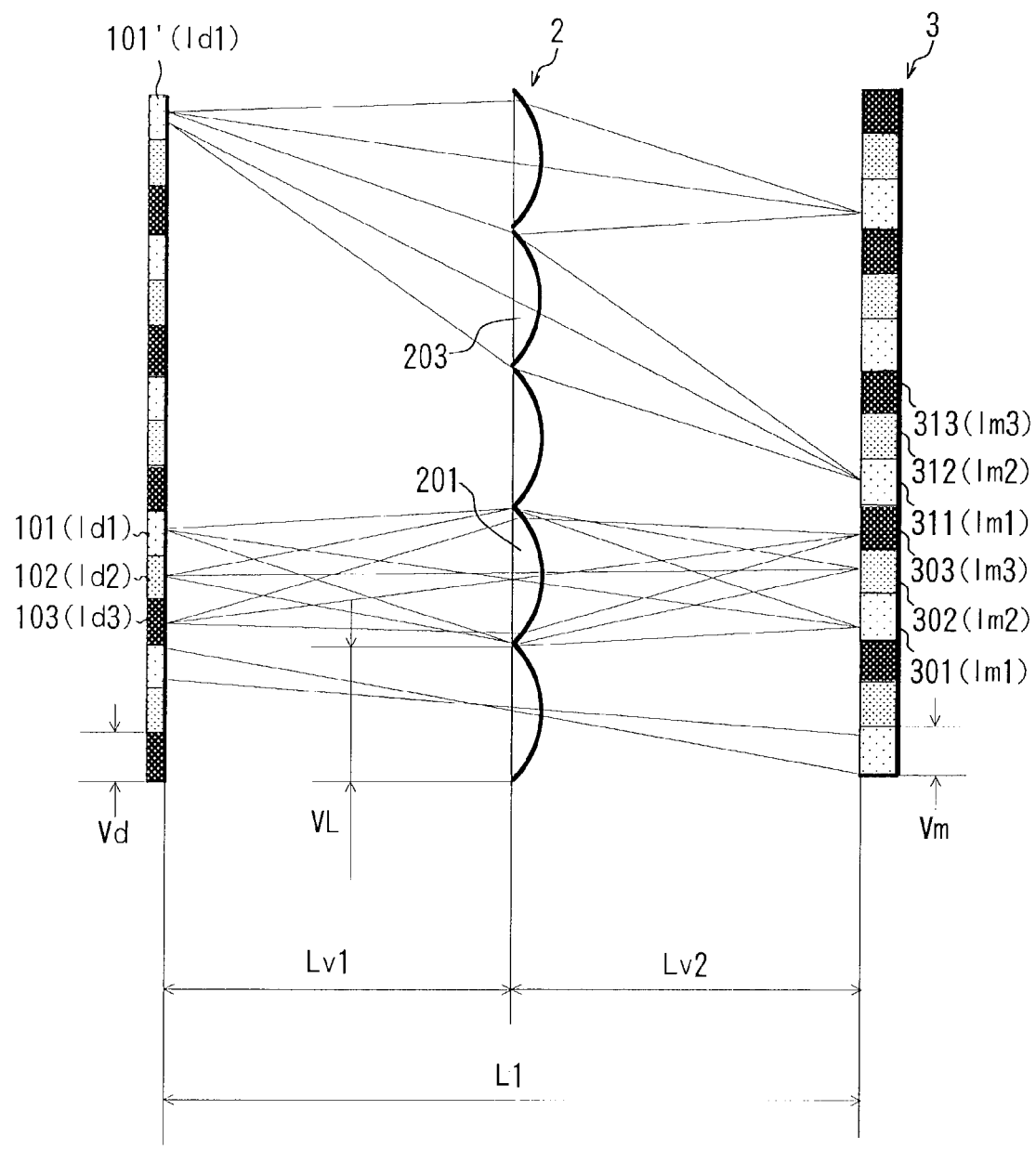
FIG. 9 is a vertical section of the stereoscopic image display apparatus.

FIG. 9 is a vertical section of the stereoscopic image display apparatus according to this embodiment. Each of the cylindrical lens portions that constitutes the horizontal lenticular lens 2 has an optical power only in the vertical direction, and does not have an optical power in the horizontal direction corresponds to a set of three (=p) vertical pixels, and plays a role of making rays of light from a set of three pixels forms images on three corresponding horizontal lens lines on the shift lenticular array 3. Owing to this, the rays of display light emerged from each horizontal pixel line on the display unit 1 are led to each corresponding horizontal lens line on the shift lenticular array 3.

Rays of light that are emerged from horizontal pixel lines 101 (ld1), 102 (ld2), and 103 (ld3), which are shown in FIG. 9, and are incident on respective corresponding cylindrical lens portions 201 in the horizontal lenticular lens 2 are formed images on corresponding horizontal lens lines 301 (lm1), 302 (lm2), and 303 (lm3) on the shift lenticular array 3. Rays of light emerged from other horizontal pixel lines are also formed images on respective corresponding horizontal lens lines on the shift lenticular array 3 similarly.

In addition, when conditions between spaces between the display unit 1, horizontal lenticular lens 2, and shift lenticular array 3, which will be explained later, and horizontal pitches of these three components are satisfied, for example, rays of light that are emerged from a horizontal pixel line 101' (ld1) and are incident on a cylindrical lens portion 203, which does not correspond to the horizontal pixel line 101' originally, in the horizontal lenticular lens 2 are also condensed on a horizontal lens line 311 on the shift lenticular array 3 that corresponds to the horizontal pixel line 101 (ld1) whose pixel arrangement order is the same as that of the horizontal pixel line 101'. Hence, a problem does not occur in the stereoscopic image display (for example, rays of display light emerged from the horizontal pixel line 101' do not reach viewpoints other than the corresponding viewpoints by being incident on horizontal lens lines 312, 313, and the like).

In addition, it is also possible to use horizontal slits instead of respective cylindrical lenses constituting the horizontal lenticular lens 2 so as to limit a range where rays of light diffuse in the vertical direction. Since structure becomes simple when the horizontal slits are used, it is possible to constitute the apparatus at a low price. On the other hand, it is preferable to use the cylindrical lenses from the viewpoint of improving a light efficiency.

Next, relational expressions among vertical parameters concerning stereoscopic image display will be explained by using FIG. 9. In addition, the number of viewpoints is generalized as r=p·q in these relational expressions.

When Lv1 is air conversion distance between the display unit 1 and horizontal lenticular lens 2, and Lv2 is air conversion distance between the horizontal lenticular lens 2 and shift lenticular array 3, the following relational expressions stand up:

| $Vd:Vm = Lv1:Lv2$ | (v1) |
|---|---|
| $2 \cdot p \cdot Vm:VL = Lv1 + Lv2:Lv1$ | (v2) |
| $1/fv = 1/Lv1 + 1/Lv2$ | (v3) | where, Vd is a pitch of the pixels in the vertical direction on the display unit 1, Vm is a pitch of the cylindrical lens portions in the vertical direction on the shift lenticular array 3 and fv is a focal length of each cylindrical lens portion, constituting the horizontal lenticular lens 2, in the vertical direction.

Furthermore, as a relational expression that connects a horizontal parameter, concerning the above-described stereoscopic image display, with the vertical parameters, the following expression stands up in regard to positions of the display unit 1 and shift lenticular array 3:

$$Lv1 + Lv2 = L1 \qquad (hv1)$$

In addition, the horizontal lenticular lens 2 is for preventing display light, emerged from each horizontal pixel line, from leaking into a horizontal lens line on the shift lenticular array 3 that does not correspond. Hence, it is also possible to replace it by a limiting mask etc. which has transmissive portions and shielding portions, which are long in the horizontal direction, besides horizontal lenticular lens 2.

Embodiment 2

Though the display unit 1 is explained as a monochrome display unit in the above-described Embodiment 1, there is a possibility of causing so-called color breakup (color separation) in the observation area 4 when this method is applied to a color display unit, where R, G, and B are arranged in a vertically striped manner as it is. The color breakup is a phenomenon that only the light from a subpixel in a specific color can be observed but the light from a subpixel in a specific color in a certain position on the observation area cannot be observed. This is caused by the relation between positions of subpixels constituting R, G, and B and positions of cylindrical lens portions of the shift lenticular array 3.

When pixels corresponding to r viewpoints are arranged on horizontal pixel lines of the display unit 1 cyclically as the above-described Embodiment 1, it is sufficient to perform the followings so as to suppress color breakup.

Viewpoints are not assigned by a pixel, but are assigned by a subpixel including the division of color display.

The number r of viewpoints is set so as not to be a multiple of three (at this time, since it is r=p·q, neither p nor q are multiples of three).

When such pixel arrangement is adopted, subpixels on each horizontal pixel line of the display unit 1 are arranged so that the relation among viewpoints and colors may go around by r·3 pieces of subpixels whose value is the L.C.M. of 3 and r, and this is repeated thereafter.

Furthermore, a viewpoint of a subpixel horizontally shifts by q every pixel row (horizontal pixel line), and since q is not a multiple of three, subpixels for the same viewpoint that are the nearest on the display unit have different colors if their rows are different. Owing to this, the color breakup does not arise.

When the number of rows of a pixel matrix be p, numbers of subpixels corresponding to R, G, and B of the same viewpoint respectively in an expanded matrix which has 3·p·r subpixels become equal to each other. Hence, color breakup does not arise since the numbers of subpixels of R, G, and B that can be observed in each viewpoint position are equal.

Figure 10A:
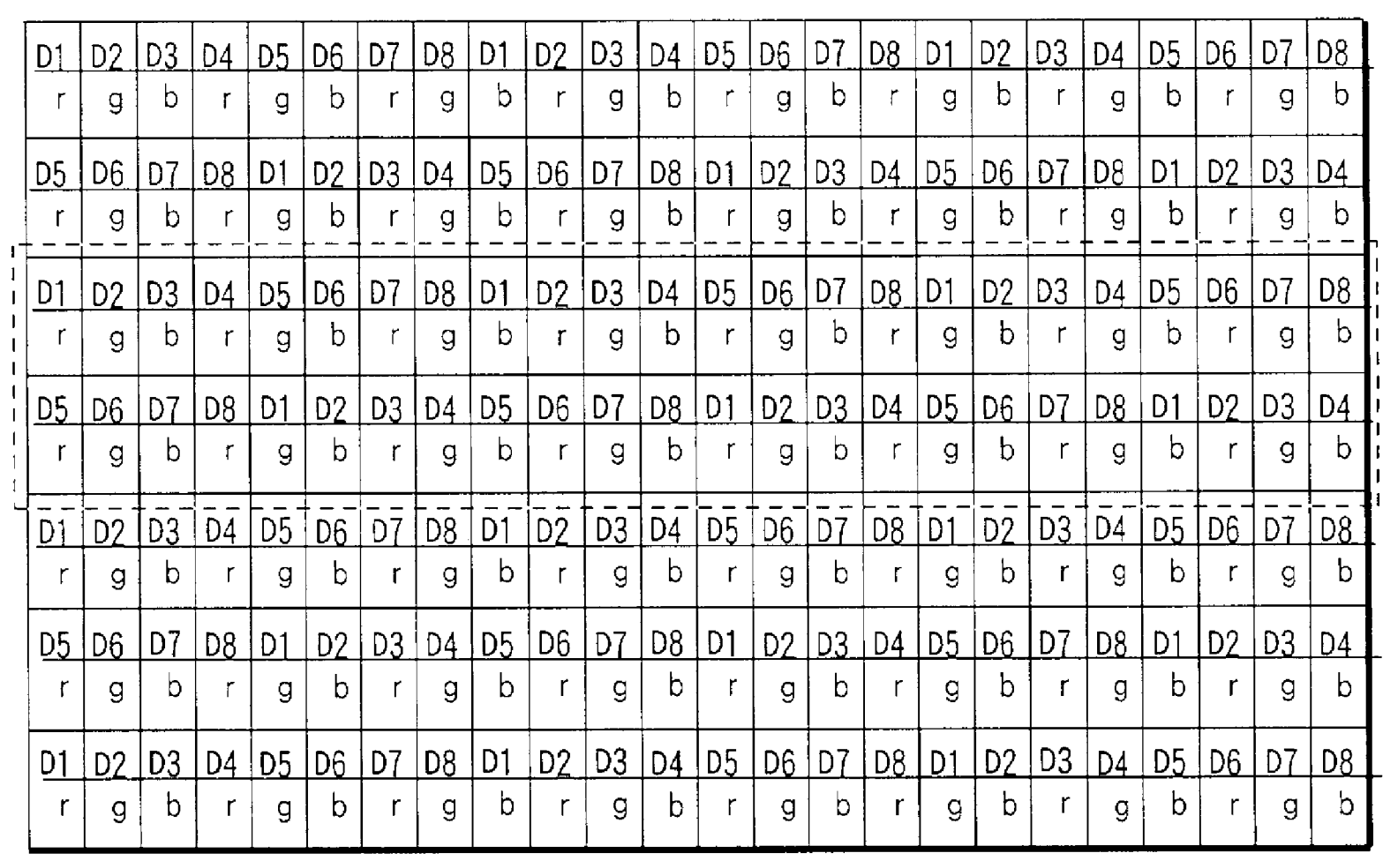

FIG. 10(A) is a drawing showing the distribution of viewpoints to subpixels when p=2, q=4, and r=8. Though this subpixel arrangement is similar to the arrangement shown in Embodiment 1 basically and is the same as the case of p=2 and q=4, this is performed not by a pixel, but by a subpixel of R, G, or B (in the drawing, subpixels are denoted as r, g, and b).

In consideration of the relation among R, G, and B and the relations of viewpoints, it can be seen that a matrix consisting of eight subpixels of 2·4 is not a basic matrix in this subpixel arrangement, but a matrix that consists of subpixels of 48=2·24 that are enclosed with a frame becomes a basic matrix to be repeated thereafter.

In a horizontal line of 48 subpixels of this basic matrix, there is one subpixel (for example, a pixel D1 of R is one) of each color in each viewpoint. Hence, two subpixels of each color in each viewpoint exist in the basic matrix.

Nevertheless, this arrangement method has a possibility that color expression of an image becomes unnatural partially since a basic matrix to the number r of viewpoints becomes excessively large.

It is possible to prevent such a problem by adopting the following structure, and it is also possible to lessen the basic matrix.

That is, a linage p of the number of viewpoints r=p·q is made an integral multiple of the number of color divisions, c (in many cases, it is 3 corresponding to R, G, and B), and, the number of columns, q is made not to be an integral multiple of the number of color divisions, c.

The assignment of viewpoints is not performed by a pixel, but is performed by a subpixel including the division of color display. Thus, the L.C.M. of the number r of viewpoints and 3 is r, and a basic matrix becomes p rows×r columns.

Figure 10B:
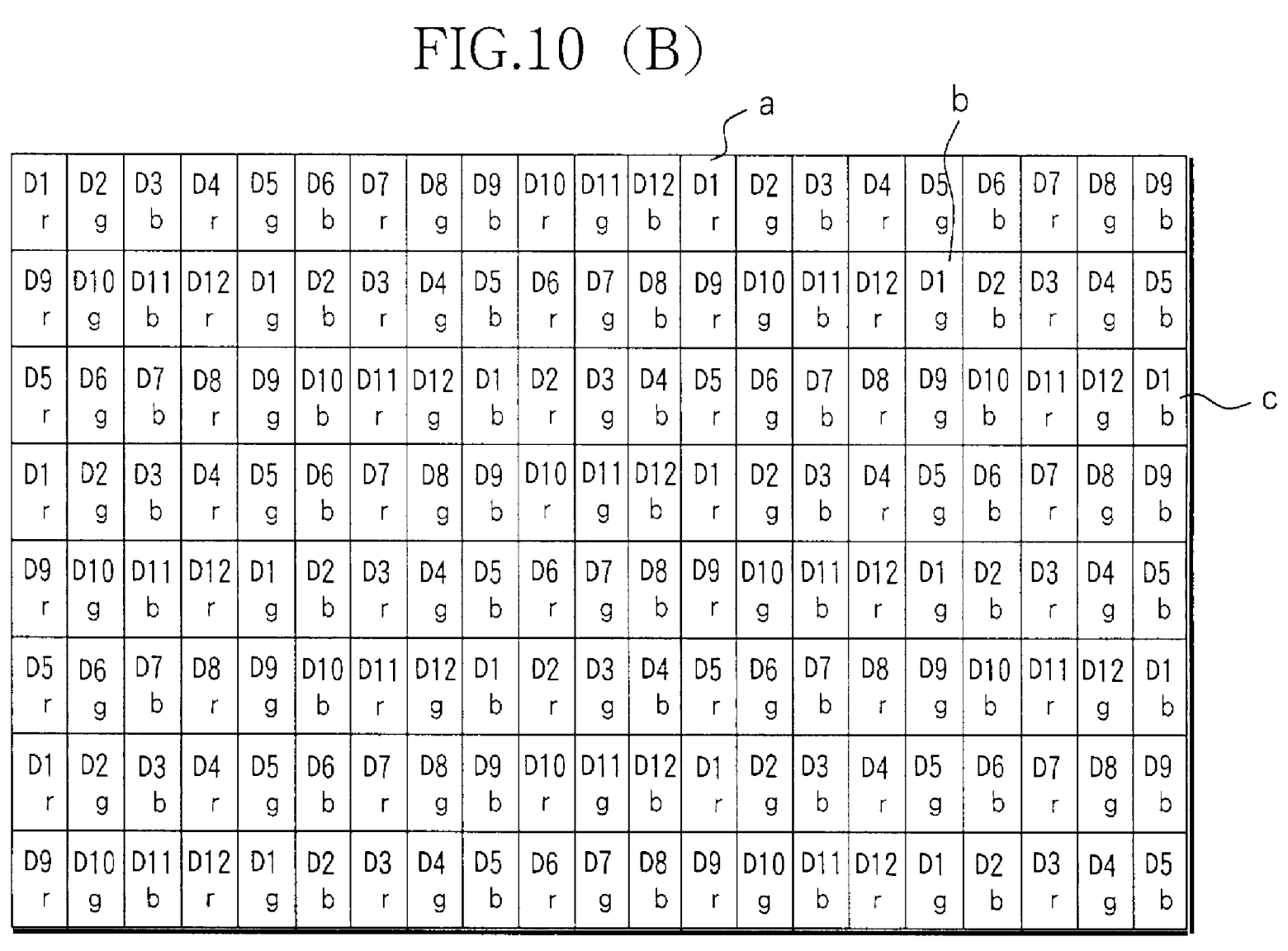

FIG. 10(B) is a drawing showing how to display images with 12 viewpoints to respective subpixels when the stereoscopic image with 12 viewpoints that P=3, q=4, and r=12 is displayed on a color display unit where subpixels of R, G, and B are arranged in a vertically striped manner.

In this embodiment, viewpoints are not assigned by pixel, but are assigned by subpixel including the division of color display, and the assignment of viewpoint images to subpixels and positions of cylindrical lens portions on the shift lenticular array 3 that correspond to it are similar to those in Embodiment 1 except that the number of viewpoints is made to be 3·4=12.

Namely, viewpoint images corresponding to twelve viewpoints E1 to E12 are repeatedly displayed sequentially by a subpixel in each horizontal pixel line of the display unit 1. Subpixels are arranged by being horizontally shifted by four (=q) subpixels with every horizontal pixel line shift and the subpixel arrangement goes around by three (=p) rows.

In addition, each of the cylindrical lens portions constituting the horizontal lenticular lens 2 corresponds to three (=p) horizontal pixel lines on the display unit 1, and rays of light from these three horizontal pixel lines on three corresponding horizontal lens lines are formed images on the shift lenticular array 3 by the cylindrical lens portions.

All the relational expressions shown in the above-described Embodiment 1 stand up in the case of P=3, q=4, and r=12.

As shown by subpixels a, b, and c in FIG. 10(B), subpixels corresponding to the viewpoint E1 are mutually arranged nearly, and the subpixels a, b, and c display colors of R, G, and B respectively. It can be seen that the color breakup does not arise in the observation area 4 by display light from these subpixels reaching the same viewpoint position E1. This is also similar to those at other viewpoints.

Though the number of viewpoints is larger than the case of p=2, q=4, and r=8 that has been already explained, it is possible to further excellently suppress the color breakup since the size of the basic pixel matrix is 3×12=36, that is, the pixel matrix is small.

Embodiment 3

In each of the above-described Embodiments, since the horizontal lens lines of the shift lenticular array 3, in which arrangement patterns of the cylindrical lens portions are different from each other, are made to correspond to respective horizontal pixel lines of the display unit 1, it is possible to lead display light at different viewpoint positions if vertical positions are different even if horizontal positions of pixels of respective horizontal pixel lines are the same.

Then, in consequence, this relieves the degradation of resolution in one direction for the other direction by distributing pixels of the display unit 1 to respective viewpoints in a matrix-like pattern to distribute the degradation of resolution, arising in either of the horizontal direction or the vertical direction, in both directions.

Hence, it is also possible to perform the distribution of pixels, explained in Embodiment 1, to respective viewpoints by other different methods. In this Embodiment and Embodiment 4 described later, the distribution of pixels to respective viewpoints by methods different from that in Embodiment 1 will be explained.

Respects different from Embodiment 1 will be emphatically explained in this embodiment. Also in this embodiment, a stereoscopic image display apparatus is constituted by using the display unit 1, horizontal lenticular lenses 2, and shift lenticular array 3.

FIG. 11 shows a distribution method of pixels to respective viewpoints that is different from that in Embodiment 1 in the case of p=3, q=3, and r=9.

In Embodiment 1, viewpoints are shifted by three (=q rows) pixels every horizontal pixel line as shown in FIG. 2. But, in this embodiment, two pixels are shifted in between a first horizontal pixel line and a second horizontal pixel line, four pixels are shifted in between the second horizontal pixel line and a third horizontal pixel line, and three pixels are shifted in between the third horizontal pixel line and the first horizontal pixel line. Hereafter, this pattern is repeated.

In this manner, so long as an arrangement pattern of the cylindrical lens portions on the shift lenticular array 3 is changed even if pixels are totally shifted by 2+3+4=9 (=r) during 3 (=p) horizontal pixel lines, it is possible to lead rays of display light, emerged from respective pixels, to respective corresponding viewpoints.

Figure 12:
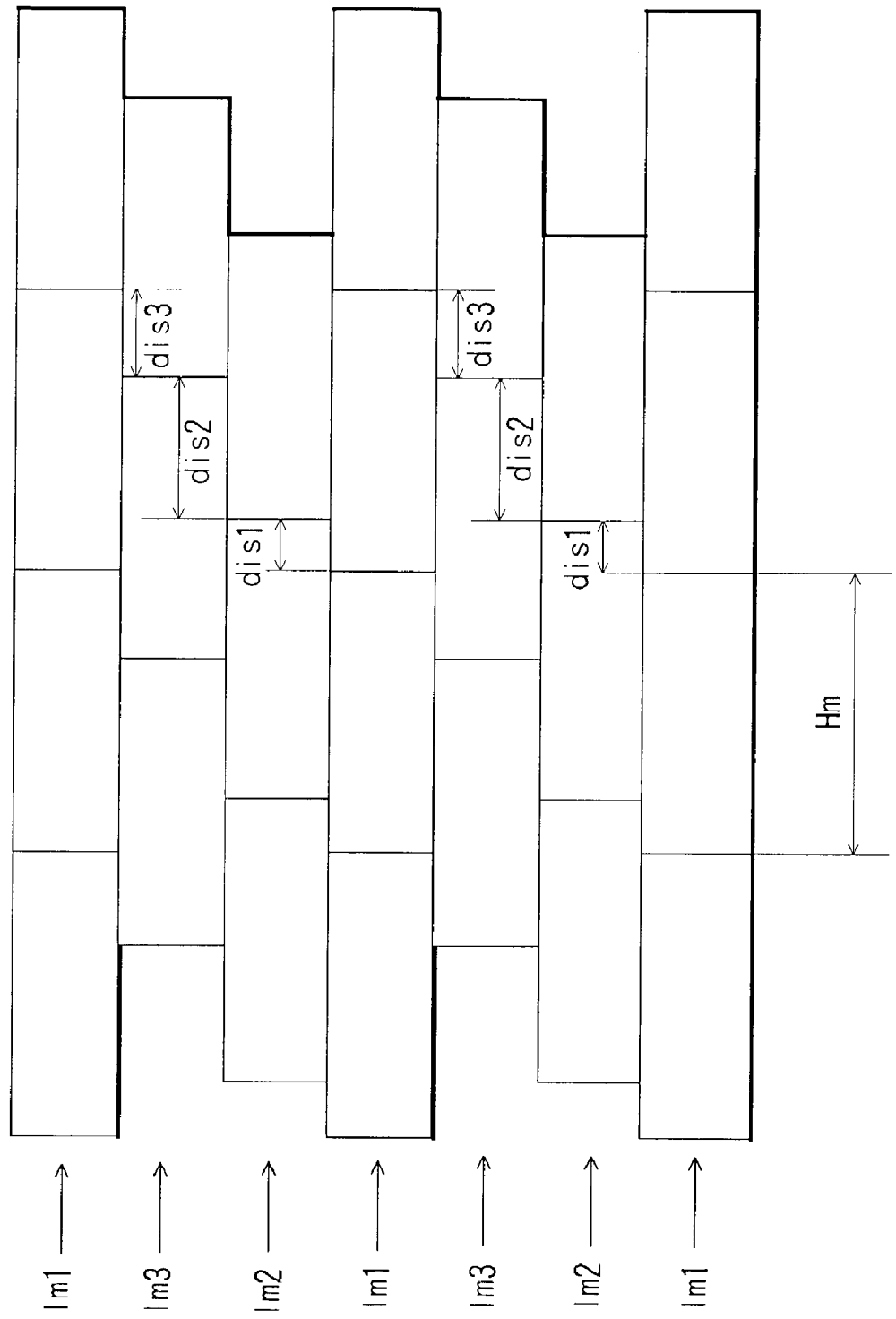
FIG. 12 is a drawing showing a cylindrical lens arrangement pattern of a shift lenticular array in Embodiment 3.

FIG. 12 is a drawing showing a cylindrical lens arrangement pattern of the shift lenticular array 3 in this embodiment. A horizontal shift amount dis1 between a cylindrical lens portion of the horizontal lens line lm1 corresponding to the horizontal pixel line ld1 and a cylindrical lens portion corresponding to the horizontal pixel line ld2 is shown in dis1=Hm/9·2. Where Hm is a horizontal interval between cylindrical lens portions in one horizontal lens line of the shift lenticular array 3.

Similarly, a horizontal shift amount dis2 between a cylindrical lens portion of the horizontal lens line lm2 and a cylindrical lens portion of the horizontal lens line lm3 is shown in dis2=Hm/9·4.

Furthermore, a horizontal shift amount dis3 between a cylindrical lens portion of the horizontal lens line lm3 and a cylindrical lens portion of the horizontal lens line lm1 is shown in dis3=Hm/9·3. Hereafter, this pattern is repeated. Here, 9=r=p·q.

Since the arrangement of pixels for each viewpoint becomes asymmetric on the entire display unit 1 when the display unit 1 is constituted in this manner, there is a possibility of making the decrease of resolution not further stand out.

Among relational expressions explained by Embodiment 1, all the relational expressions other than the relational expression h4 concerning a horizontal shift amount of a cylindrical lens stand up in this embodiment.

Embodiment 4

Though viewpoint images corresponding to r (=p·q) pieces of viewpoints are displayed by r pieces of pixels lined up horizontally in the above-described Embodiments 1 to 3, it is also possible to adopt structure different from these. Respects different from Embodiments 1 to 3 will be emphatically explained also in this embodiment.

Also in this embodiment, a stereoscopic image display apparatus is constituted by using a display unit 1, horizontal lenticular lens 2, and shift lenticular array 3.

Also in this embodiment, rays of light from a set of horizontal pixel lines (for example, ld1, ld2, and ld3) on the display unit 1 are formed images on horizontal lens lines (for example, lm1, lm2, and lm3) on the shift lenticular array 3, which correspond respectively, by the optical actions of the horizontal lenticular lens 2.

FIG. 13 shows a distribution method of pixels to respective viewpoints that is different from those in Embodiments 1 to 3 in the case of p=3, q=3, and r=9.

In this Embodiment, viewpoint images corresponding to viewpoints E1, E4, and E7 are displayed every three (=P) viewpoints in pixels D1, D4, and D7 on the horizontal pixel line ld1. Similarly, on horizontal pixel lines ld2 and ld3, viewpoint images corresponding to viewpoints E2, E5, and E8, and E3, E6, and E9 are displayed every three (=p) viewpoints in pixels D2, D5, and D8, and D3, D6, and D9.

Figure 14:
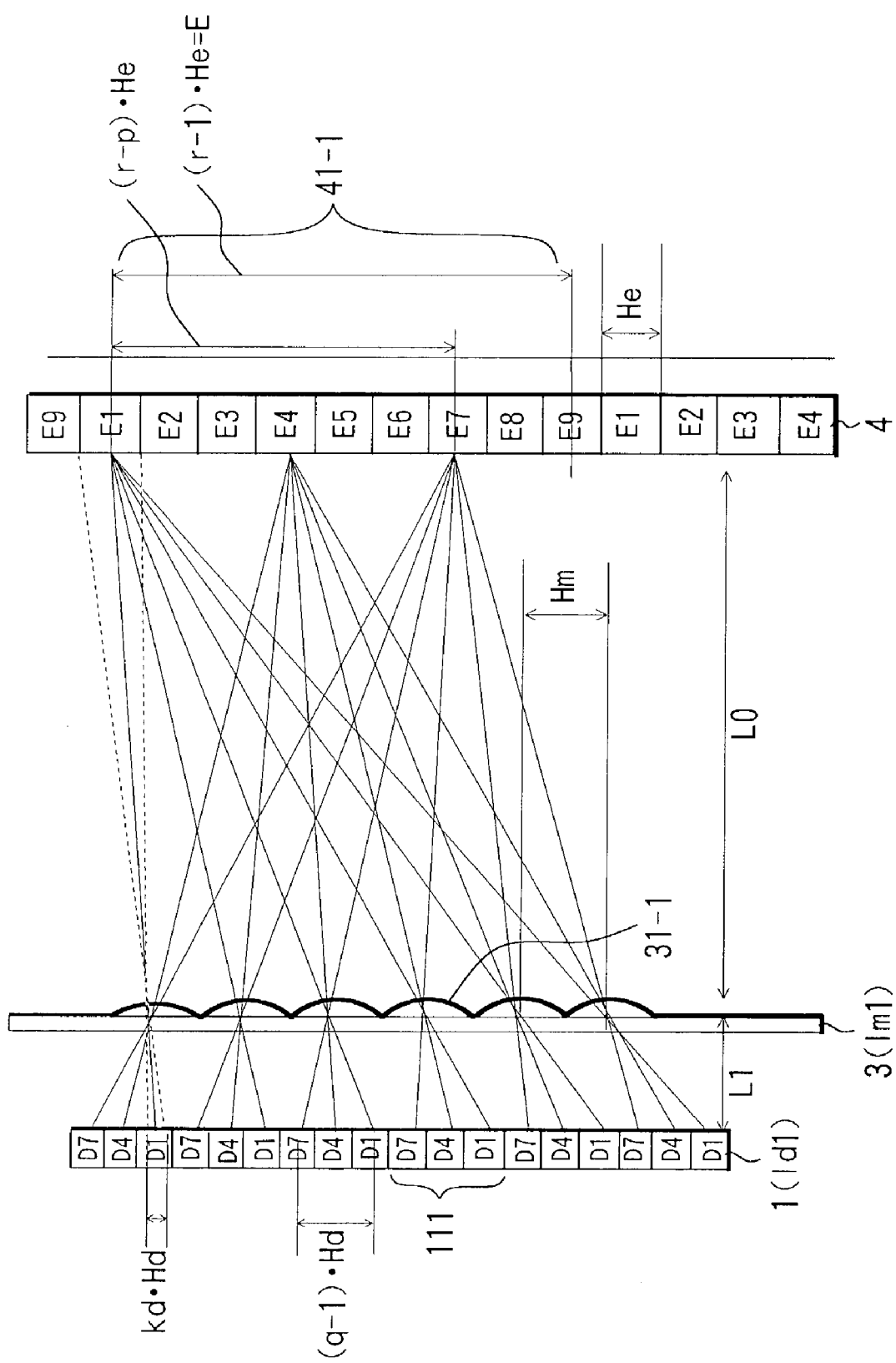
FIG. 14 is a horizontal section of the stereoscopic image display apparatus according to the Embodiment 4.
Figure 15:
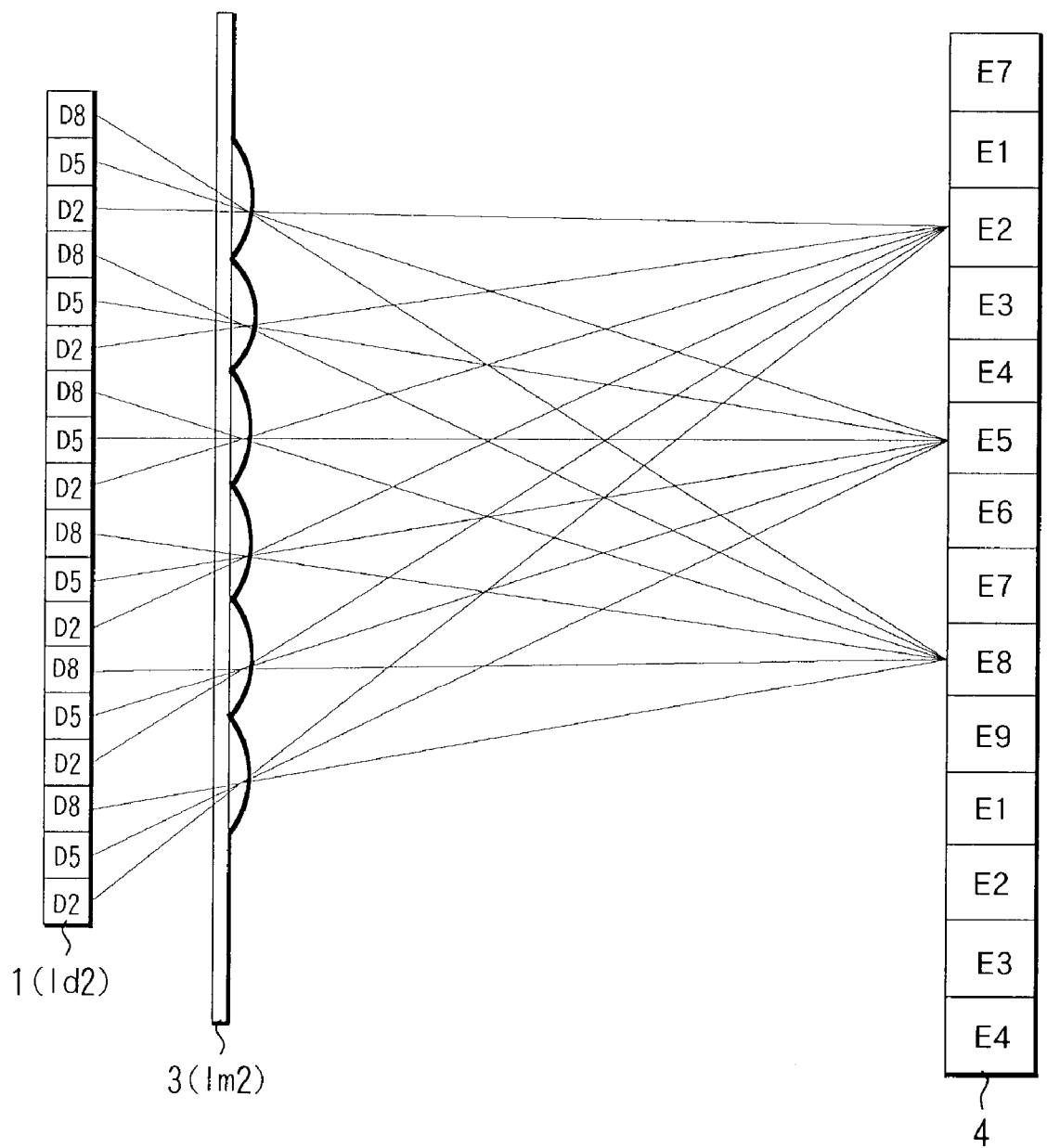
FIG. 15 is a horizontal section of the stereoscopic image display apparatus according to Embodiment 4.
Figure 16:
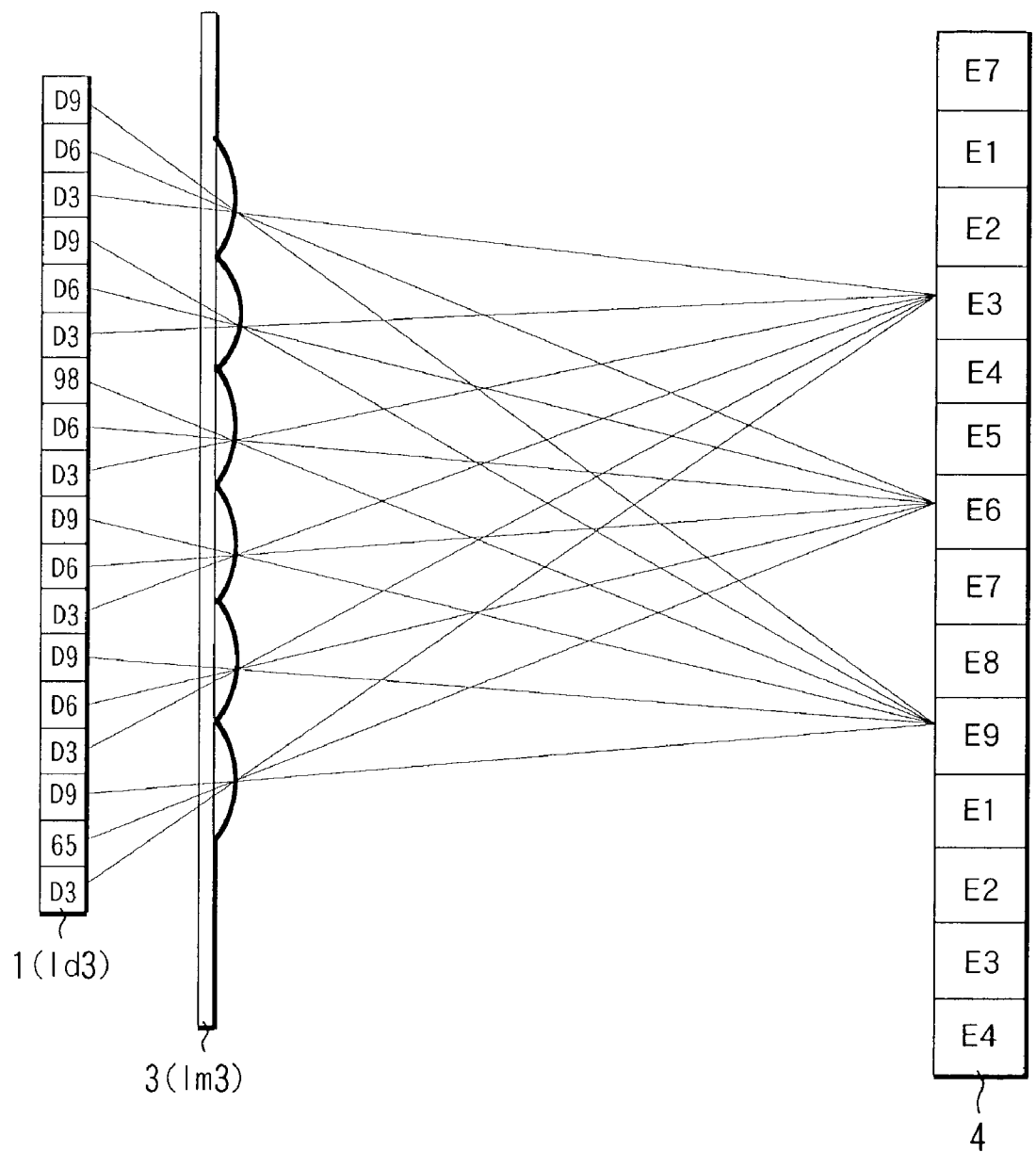
FIG. 16 is a horizontal section of the stereoscopic image display apparatus according to Embodiment 4.

FIGS. 14 to 16 show horizontal sections including the horizontal pixel line ld1 and horizontal lens line lm1, the horizontal pixel line ld2 and horizontal lens line lm2, and the horizontal pixel lines ld3 and horizontal lens line lm3 respectively in this embodiment. Furthermore, the horizontal lenticular lens 2 is omitted in these drawings. Hereafter, the principle of the stereoscopic image display in this embodiment will be explained by using these drawings.

In FIG. 14, rays of display light from the pixels D1, D4, and D7 in a consecutive area 111 on the horizontal pixel line ld1 pass a cylindrical lens portion 31-1 of the shift lenticular array 3, and reach the viewpoints E1, E4, and E7 in a range 41-1, corresponding respectively, on an observation area 4. As explained later in detail, by properly choosing an aperture rate kd of pixels of the display unit 1, rays of display light from the pixels D1, D4, and D7 cannot reach viewpoints other than the viewpoints E1, E4, and E7 corresponding on the observation area 4.

Rays of display light from respective pixels in other areas on the horizontal pixel line ld1 also pass the cylindrical lens portions of the shift lenticular array 3, and reach the viewpoints E1, E4, and E7 corresponding respectively without reaching other non-corresponding viewpoints.

As shown in FIGS. 15 and 16, rays of display light from the pixels D2, D5, and D8, and D3, D6, and D9 corresponding to the viewpoints E2, E5, and E8, and E3, E6, and E9 on the horizontal pixel lines ld2 and ld3 reach the viewpoints E2, E5, and E8, and E3, E6, and E9 respectively by an arrangement pattern of the cylindrical lens portions on the shift lenticular array 3 where positions of the cylindrical lens portions on the corresponding horizontal lens lines lm2 and lm3 of the shift lenticular array 3 shifts horizontally, and do not reach other non-corresponding viewpoints.

Further detailed explanation will be performed by using FIG. 14. The center distance between pixels D1 and D7 is 2·Hd corresponding to (q−1)·Hd, and hence, separation width in the observation area 4 owing to it is 6·He corresponding to (r−p)·He, where width in the case of regarding each viewpoint as an area is "He".

"He" is associated with the separation width E of r viewpoints by the following relation:

$$E=(r-1)\cdot He \qquad (h100)$$

Hence, E=8·He in the case of the structure in FIG. 14.

At this time, the following relational expression stands up:

$$(q-1) \cdot Hd : (r-p) \cdot He = L1 : L0 \quad \text{(h101)}$$

Hence, a space Hm between cylindrical lens positions of the shift lenticular array 3 satisfies the following relation:

$$q \cdot Hd : Hm = L1 + L0 : L0 \quad \text{(h102)}$$

Moreover, the divergence of display light from the pixel D1 in the observation area 4 is given as $Hd \cdot kd \cdot L0/L1 + Hm$, since rays of light that are emerged from both ends of an effective pixel portion and are incident on a center of a corresponding cylindrical lens portion in the shift lenticular array 3 diverge to an amount obtained by adding divergence width of the rays in the observation area 4, to the width of the cylindrical lens portion, where kd is an aperture rate of a pixel. Thus, conditions for rays of display light from the pixel D1 being accommodated within the width of the viewpoint (area) E1 not to leak to adjacent viewpoints are as follows:

$$Hd \cdot kd \cdot L0/L1 + Hm = He \quad \text{(h103)}$$

Resolving expression (h103) from expression (h100), $$L1 = Hd \cdot L0 \cdot (r-1)/(p \cdot E)$$

$$He = E/(r-1)$$

$$Hm = Hd \cdot E \cdot r/(Hd \cdot (r-1) + p \cdot E)$$

$$kd = (E \cdot p - Hd \cdot (r-1) \cdot (r-1))/((E \cdot p + Hd \cdot (r-1)) \cdot p)$$

So long as these expressions are satisfied, rays of display light from the pixels D1, D4, and D7 in FIG. 14 reach only the viewpoints E1, E4, and E7 respectively among the viewpoints E1 to E9 corresponding to nine viewpoints, and do not reach other non-corresponding viewpoints.

In addition, similarly also in the sections shown in FIGS. 15 and 16, rays of display light from the pixels D2, D5, and D8, and the pixels D3, D6, and D9 reach only viewpoints E2, E5, and E8, and E3, E6, and E9 respectively, which correspond to the above-described pixels, among nine viewpoints E1 to E9, and do not reach other non-corresponding viewpoints.

Figure 17:
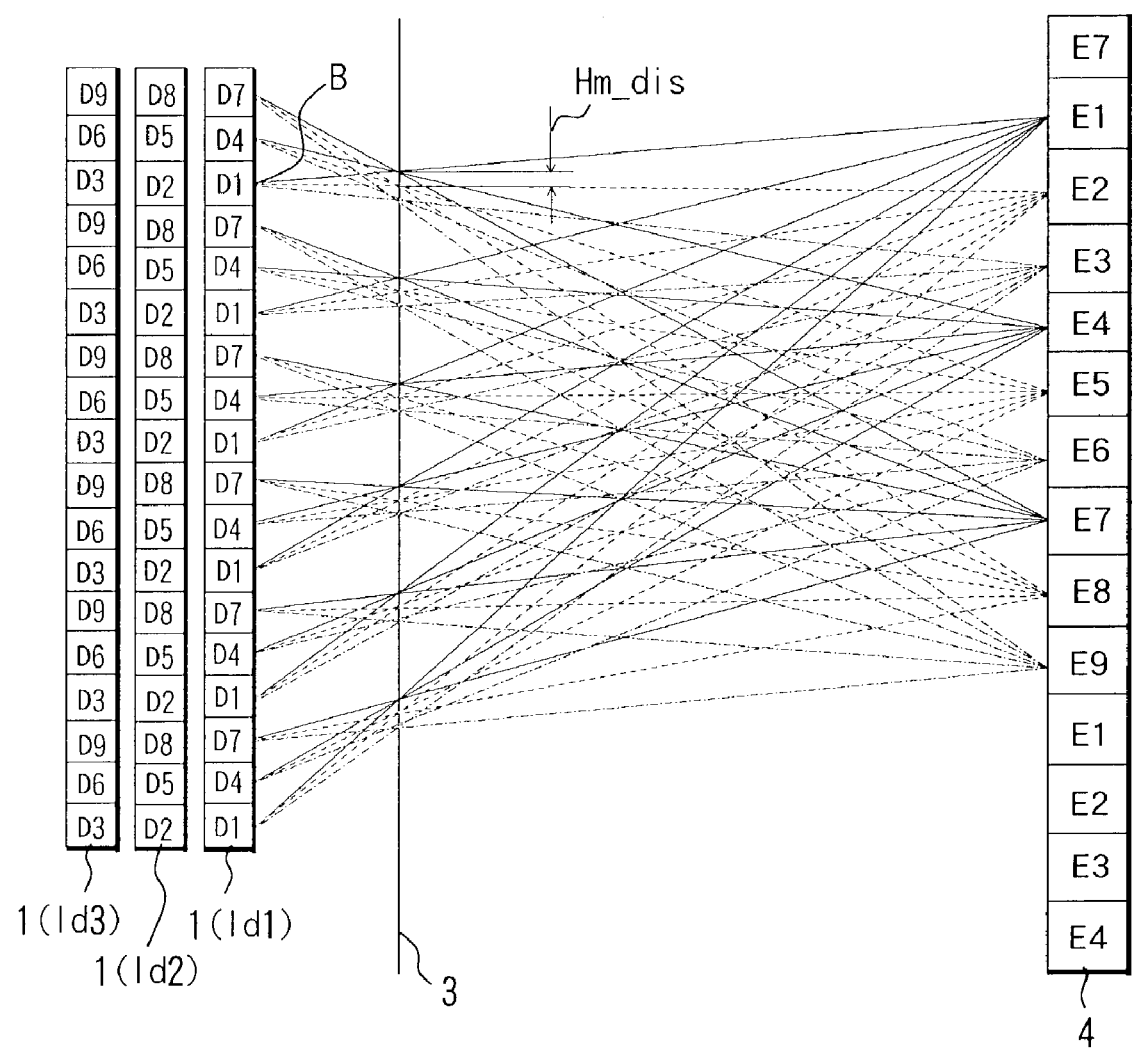
FIG. 17 is a horizontal section of the stereoscopic image display apparatus according to Embodiment 4.

FIG. 17 is an explanatory diagram showing the sections shown in FIGS. 14 to 16 with being stacked, and three types of horizontal pixel lines ld1, ld2, and ld3 of the display unit 1 are shown with being mutually shifted horizontally. The horizontal lenticular lens 2 is omitted in FIG. 17.

Furthermore, the shift lenticular array 3 is shown by a mere straight line with omitting a cylindrical lens portion in FIG. 17.

A shift amount Hm_dis between positions of the cylindrical lens portions in between the horizontal lens lines lm1, lm2, and lm3 in the shift lenticular array 3 will be explained by using FIG. 17.

In this embodiment, a viewpoint corresponding to each pixel in the horizontal pixel line ld2 of the display unit 1 shifts by one viewpoint from a viewpoint corresponding to each pixel, whose horizontal position is the same as that of each pixel in the horizontal pixel line ld1.

Figure 18:
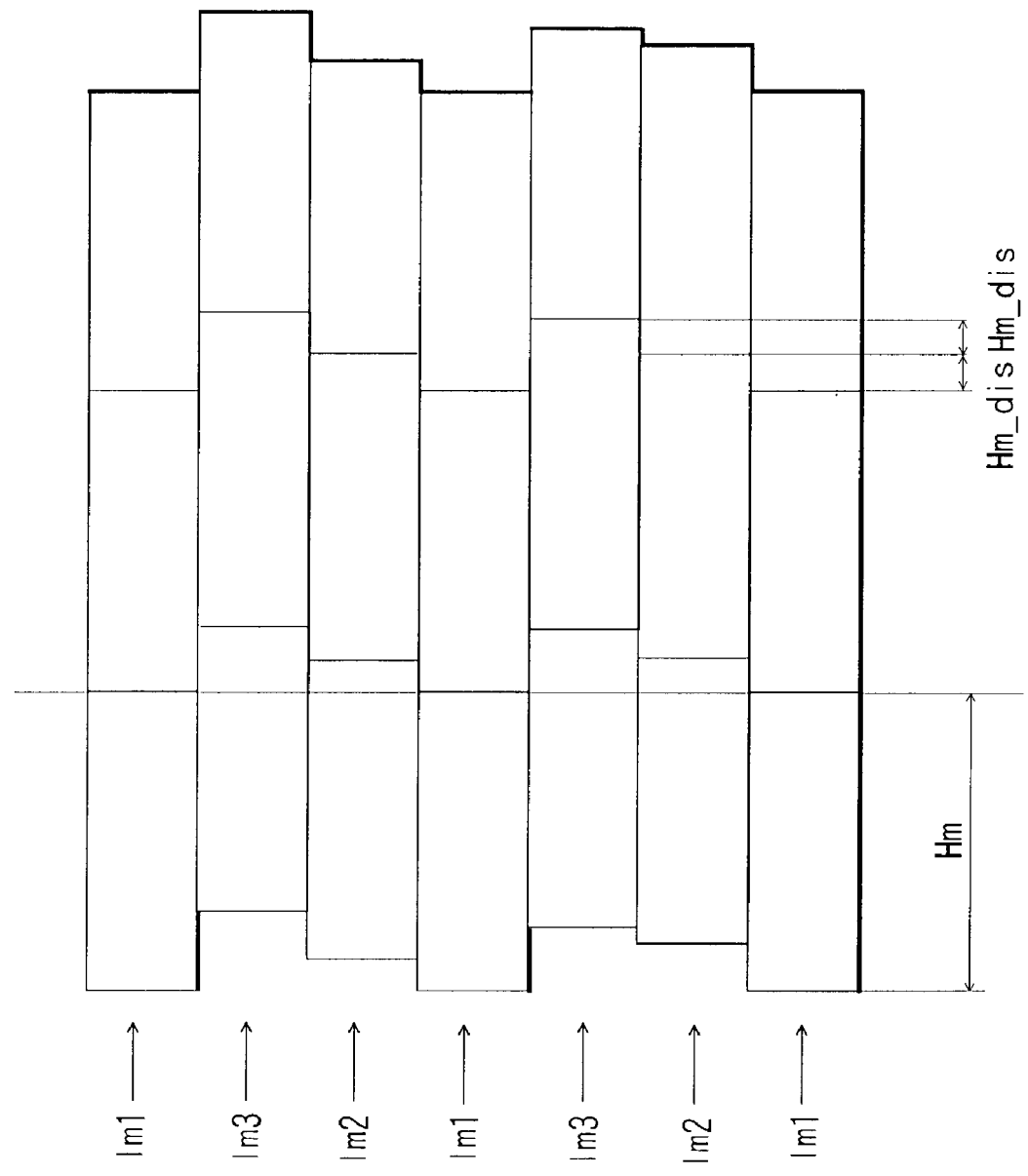
FIG. 18 is a drawing showing a shift lenticular array pattern in the stereoscopic image display apparatus according to Embodiment 4.

Hence, rays of display light emerged from a point of a pixel in FIG. 17, for example, a point B, reach the viewpoint E1 in the observation area 4 if it is a pixel on the horizontal pixel line ld1, or reach the viewpoint E2 if it is a pixel on the horizontal pixel line ld2. When using primary geometry with paying attention to these two rays of light, a shift amount Hm_dis between positions of the cylindrical lens portions in among horizontal lens lines lm1, lm2, and lm3 in FIG. 18 showing a shift lenticular array pattern according to this embodiment is given by the following expression:

$$Hm\_dls : He = L1 + L0 : L1 \quad \text{(h104)}$$

Resolving the above-described expression (h104) from expressions (h100) and (h103), $$Hm\_dls = Hd \cdot E/(Hd \cdot (r-1) + p \cdot E) = Hm/r$$

Namely, a cylindrical lens portion of the horizontal lens line lm2 horizontally shifts by ⅓ of the horizontal width Hm of the cylindrical lens portion to a cylindrical lens portion of the horizontal lens line lm1. In addition, a cylindrical lens portion of the horizontal lens line lm3 horizontally shifts by ⅓ of the above-described horizontal width Hm to the cylindrical lens portion of the horizontal lens line lm2.

Embodiment 5

Figure 19:
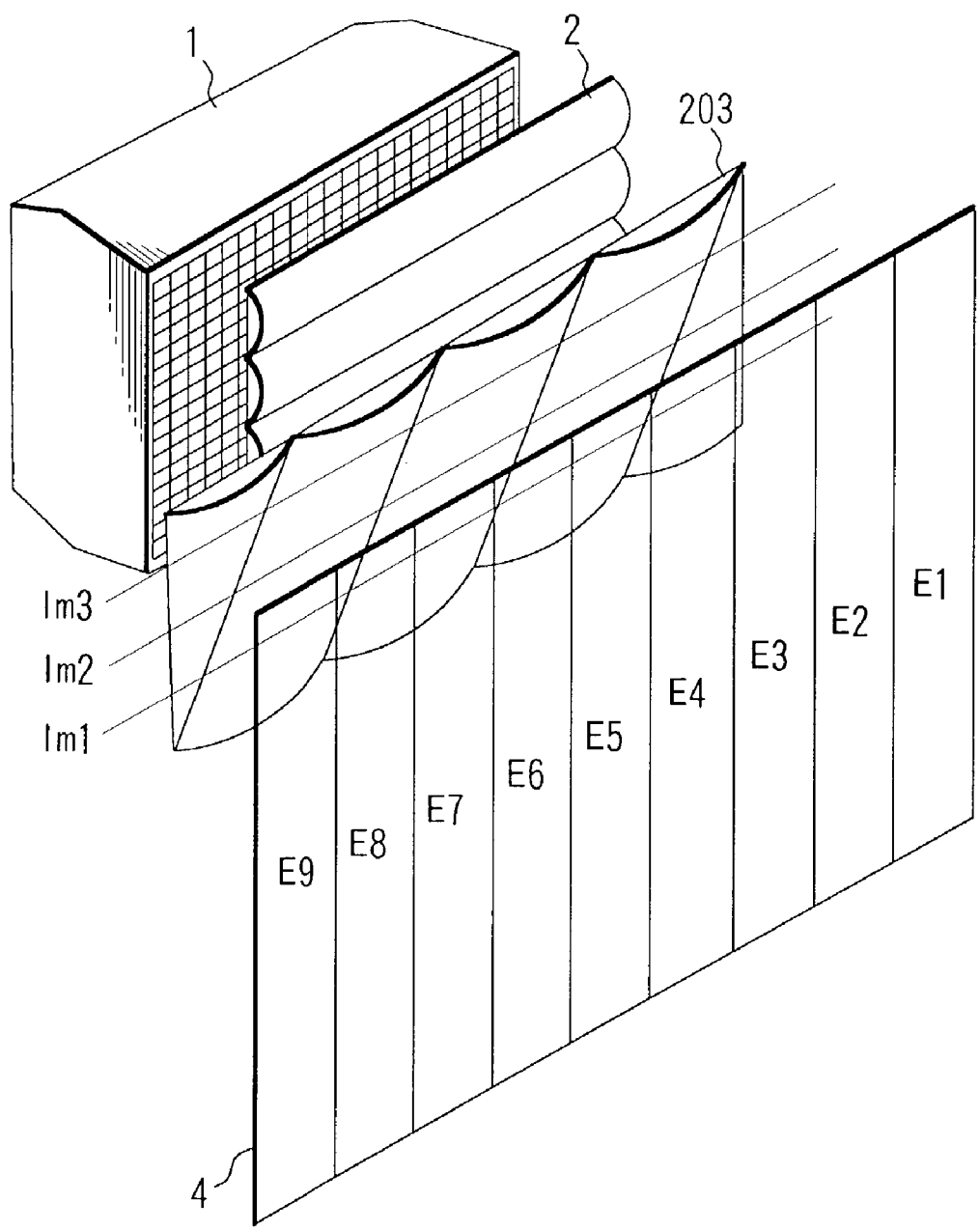
FIG. 19 is a perspective view showing the structure of a stereoscopic image display apparatus that is Embodiment 5 of the present invention.

FIG. 19 shows the structure of a stereoscopic image display apparatus that is Embodiment 5 of the present invention. The same reference characters are assigned in this embodiment to components common to those in Embodiment 1.

This embodiment differs from Embodiment 1 at a point of using a diagonal lenticular array sheet 203, diagonally extending to the horizontal direction, for horizontal light separation without using a shift lenticular array. Hereafter, this diagonal lenticular array sheet 203 will be explained.

Figure 20:
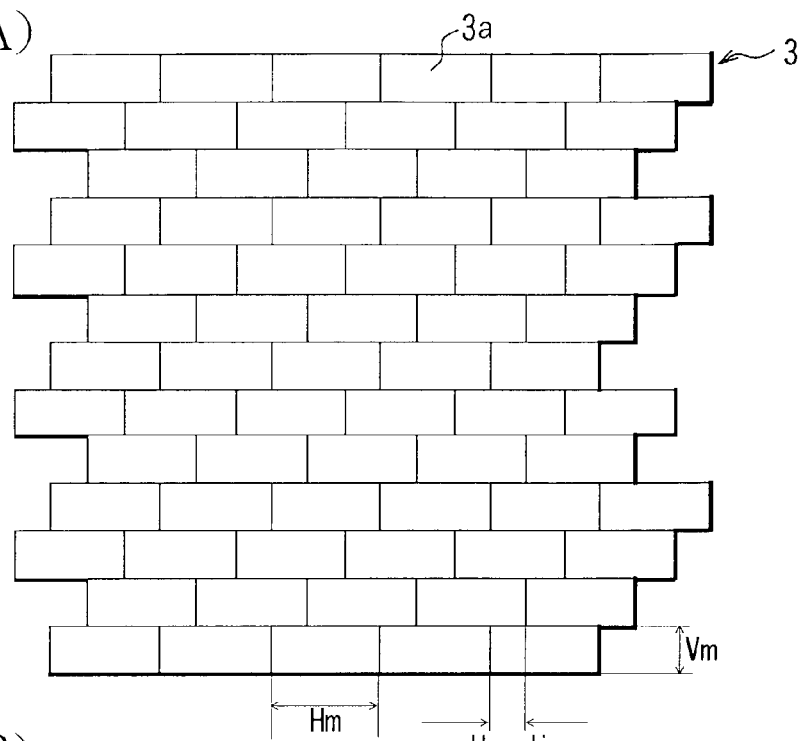
FIGS. 20(A) and 20(B) are drawings for explaining the relation between the shift lenticular array in Embodiment 1 and a diagonal lenticular array sheet in Embodiment 5.
Figure 20:
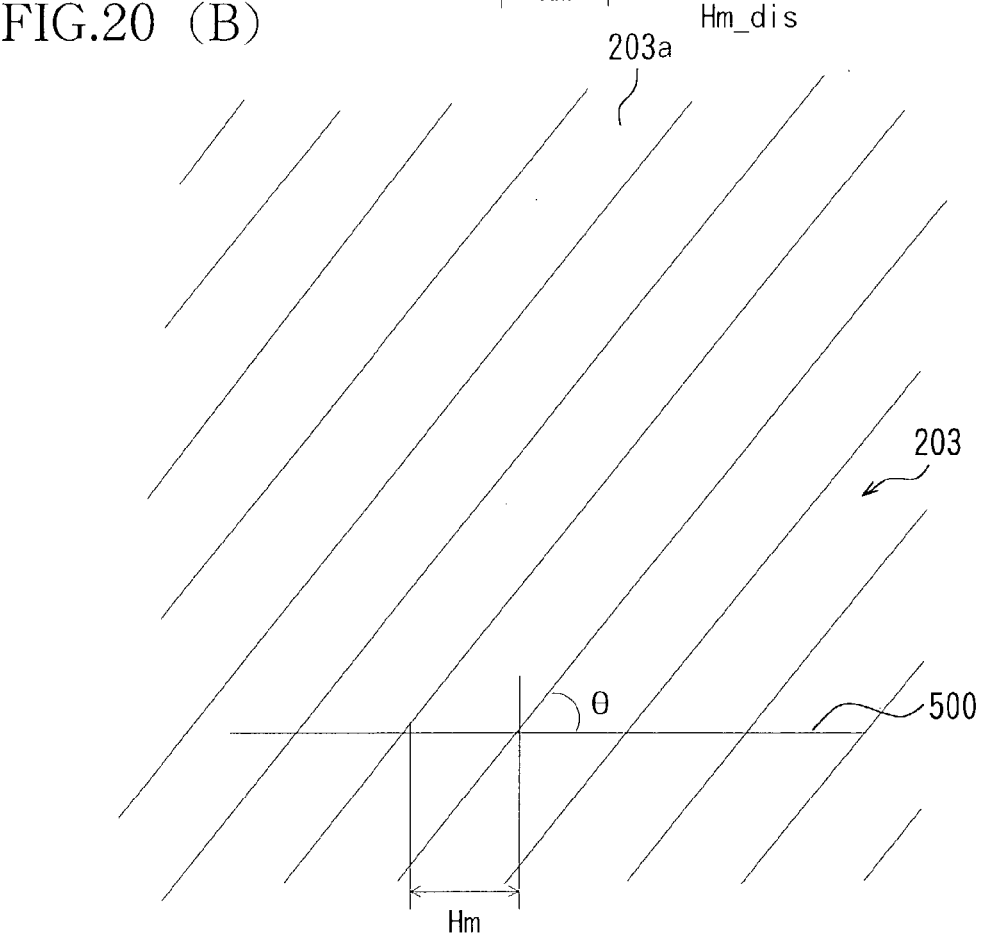

FIG. 20(A) is a front view of the shift lenticular array 3 used in Embodiment 1. In Embodiment 1, the cylindrical lens portions 3a that are arranged with being divided vertically and horizontally and constitute the shift lenticular array 3 horizontally orient rays of display light from the display unit 1 to each viewpoint.

On the other hand, the diagonal lenticular array sheet 203 in which the diagonal cylindrical lens portions 203a corresponding to lens portions made by diagonally connecting the cylindrical lens portions 3a in FIG. 20(A) are repeatedly arranged horizontally is used in this Embodiment as shown in FIG. 20(B).

Each of the diagonal cylindrical lens portions 203a shown in FIG. 20(B) has an optical power in the horizontal direction, and does not have an optical power in the vertical direction. It is possible to produce such a diagonal cylindrical lens portion 203a by grinding a die from die material with diagonally moving, for example, a thin rotating cutting tool in a horizontal plane and performing plastic molding by using this die.

Figure 21:
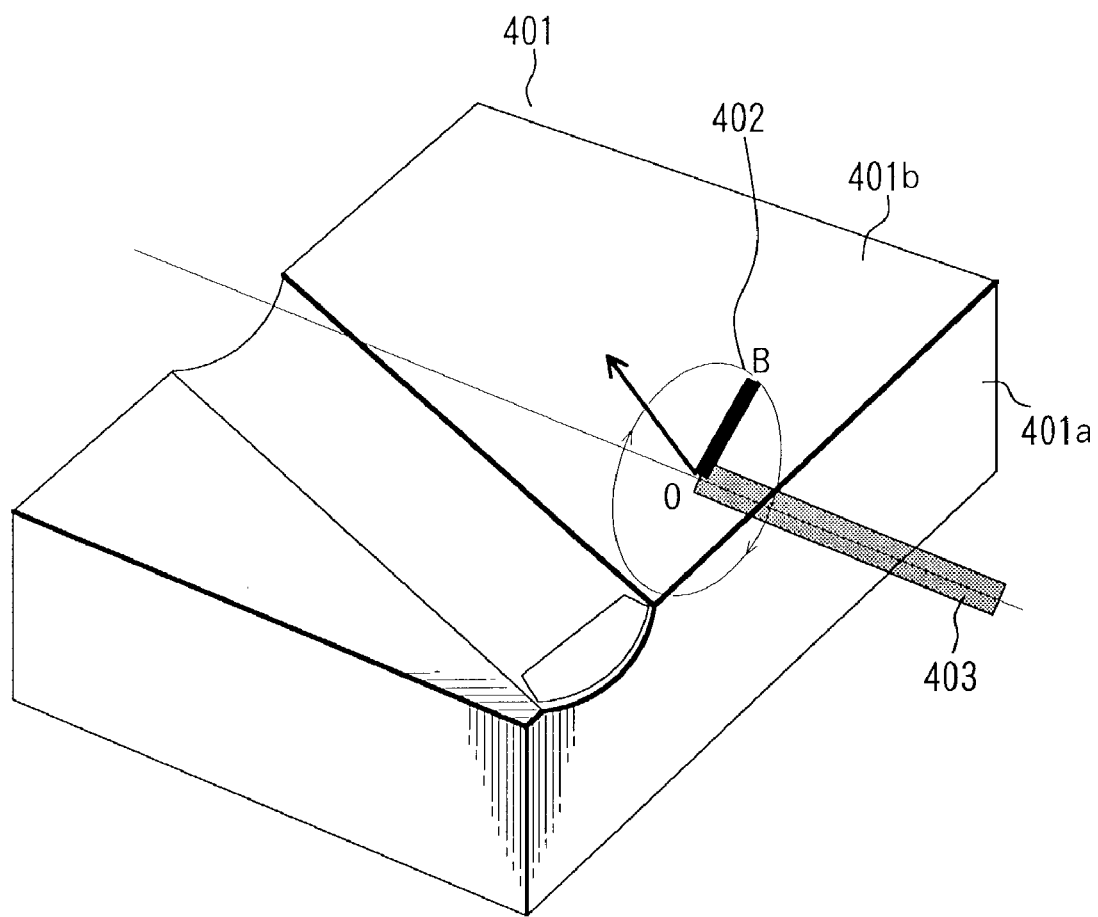
FIG. 21 is a drawing for explaining a production method of molding the diagonal lenticular array sheet.

FIG. 21 is a schematic diagram for explain a manufacturing method of a die used for molding. Reference numeral 401 denotes a die material under processing, reference numeral 402 denotes a turning tool, and reference numeral 403 denotes a rotation shaft of the turning tool 402.

The turning tool 402 rotates in a plane parallel to a surface 401a of the die material and the rotation shaft 403 of the turning tool 402 is orthogonal to the surface 401a.

The length (OB) of the turning tool is made to be equal to a radius of curvature of the diagonal cylindrical lens portion 203a in the horizontal direction (a direction in a plane parallel to the surface 401a). The turning tool 402 is advanced in a direction, which inclines by a predetermined angle to the direction of the rotation shaft 403, in a surface 401b of the die material 401 with rotating in the plane parallel to the surface 401a, and cuts the die material 401.

It is possible to form a groove 404, having a curvature in the horizontal direction (a direction parallel to the surface

401a) and not having a curvature in the vertical direction (a direction of the rotation shaft of the turning tool 402), by such a method. Hence, a die is produced, the die that is for producing the diagonal lenticular array sheet 203, which has an optical power only in the horizontal direction but does not have an optical power in the vertical direction, and in which the diagonal cylindrical lens portions 203a line up horizontally, as explained in FIG. 20(B) by repeatedly forming this groove 404.

The diagonal lenticular array sheet 203 will be explained by using FIGS. 20(A) and 20(B) again. As already described, the diagonal cylindrical lens portions 203a shown in FIG. 20(B) correspond to a member that cylindrical lens portions 3a of the shift lenticular array 3 shown in FIG. 20(A) are diagonally connected. For example, a horizontal curvature and a horizontal pitch of the cylindrical lens portions 203a in a horizontal plane 500 are set equally to a horizontal curvature and a horizontal pitch of the cylindrical lens portions 3a shown in FIG. 20(A).

In addition, an inclination angle θ of the diagonal cylindrical lens portion 203a in FIG. 20(B) is given by:

$$\theta = \tan^{-1}(Vm/Hm\_dis)$$

where Vm is a vertical pitch and Hm_dis is a horizontal shift amount of the cylindrical lens portions 3a in FIG. 20(A).

Namely, the diagonal lenticular array sheet 203 has an optical action, being similar to that of the shift lenticular array 3 according to Embodiment 1, on horizontal lines corresponding to the horizontal lens lines lm1, lm2, and lm3 in Embodiment 1.

Hence, it is possible in this embodiment to perform the distribution of pixels to nine viewpoints similarly to that in Embodiment 1.

Embodiment 6

In this embodiment, in particular, structure will be explained, the structure that one cylindrical lens portion constituting a horizontal lenticular lens 2 corresponds to one horizontal pixel line on a display unit 1, and that rays of display light from one horizontal pixel line are formed images vertically on one corresponding horizontal lens line in a shift lenticular array 3.

In Embodiment 1 and the like, structures are explained, the structures that the number of viewpoints is r, and the width of one cylindrical lens portion constituting the horizontal lenticular lens 2 corresponds to p lines of horizontal pixel lines in the case of regarding a pixel arrangement matrix, which corresponds to respective viewpoints that are arranged on the display unit 1, as r=p (rows)×q (columns). In this case, rays of display light from p lines of horizontal pixel lines corresponding to one cylindrical lens are formed images vertically on p lines of horizontal lens lines in the shift lenticular array 3, corresponding respectively, by the cylindrical lens portion.

On the other hand, structure will be explained in this embodiment, the structure that one cylindrical lens portion corresponding to one horizontal pixel line is provided, and rays of display light from the horizontal pixel line are formed images vertically on one horizontal lens line on the shift lenticular array 3.

Figure 22:
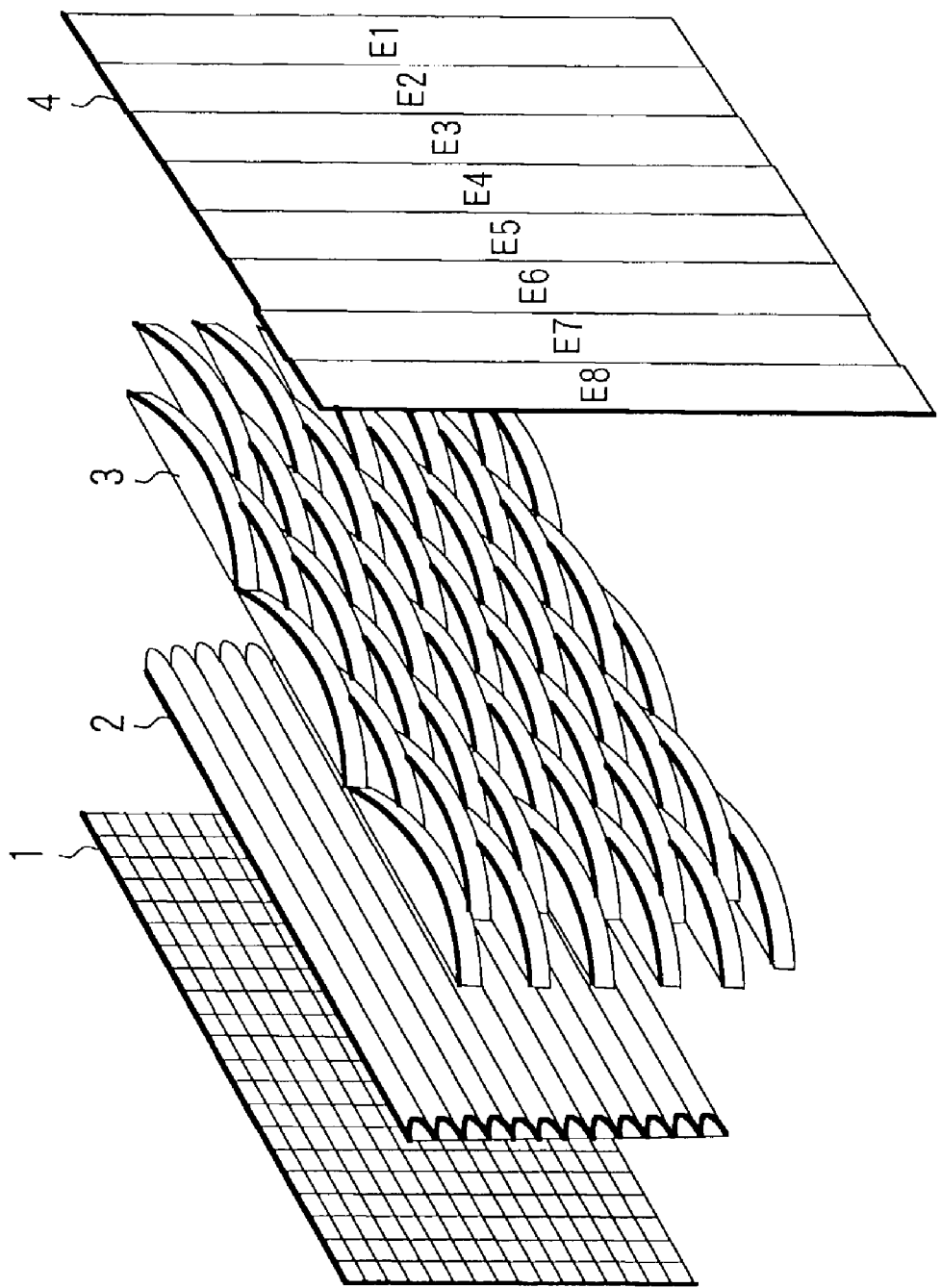
FIG. 22 is a perspective view showing the structure of a stereoscopic image display apparatus that is Embodiment 6 of the present invention.

FIG. 22 shows the schematic structure of a stereoscopic image display apparatus according to this embodiment. Similarly to the stereoscopic image display apparatus shown in FIG. 1, the stereoscopic image display apparatus according to this embodiment is also constituted by a display unit 1 in which a predetermined pixel arrangement pattern is performed, a horizontal lenticular lens 2 in which a plurality of cylindrical lens portions each of which corresponds to one horizontal pixel line on the display unit 1 is arranged in the vertical direction, and a shift lenticular array 3 having an arrangement pattern determined in consideration of the pixel arrangement pattern on the display unit 1 etc. Here, this embodiment has a characteristic in the respect that each cylindrical lens portion constituting the horizontal lenticular lens 2 is provided independently for each horizontal pixel line.

FIG. 23 is a front view showing an example of the arrangement of pixels displaying images that are displayed in the display unit 1 used in this embodiment and correspond to respective viewpoints. In this embodiment, since each cylindrical lens portion of the horizontal lenticular lens 2 corresponds to one horizontal pixel line, vertical width of each cylindrical lens portion does not relate to the number of rows (p) included in each matrix. Nevertheless, as explained later, in order to prevent images, corresponding to respective viewpoints, from being mixed, it is preferable to arrange pixels corresponding to respective viewpoints in a matrix-like pattern that is determined by the positional relation among respective components of the stereoscopic image display apparatus described in this embodiment.

In FIG. 23, the matrix arrangement regarded as p=2 and q=4 for the number of viewpoints r(=8) is formed. That is, the matrix arrangement is formed by shifting horizontal positions by four (=q) pixels every horizontal pixel line and making two (=p) lines of horizontal pixel lines a vertical unit. In other words, horizontal pixel lines with the same pixel arrangement every other horizontal pixel line are repeatedly arranged like ld1 and ld2 in FIG. 23.

It is preferable that each cylindrical lens portion constituting the shift lenticular array 3 used for the pixel arrangement shown in FIG. 23 has an optical power only in a horizontal direction, and has the height corresponding to each horizontal pixel line of the display unit 1, and the width equal to that of eight pixels. In addition, it is preferable that all the arrangement of pixels corresponding to all cylindrical lens portions on the shift lenticular array 3 is the same so as to prevent images corresponding to respective viewpoints from mixing. Hence, since the horizontal pixel lines ld1 and ld2 on the display unit 1 are arranged alternately in the vertical direction as shown in FIG. 23, two types of horizontal lens lines in which the positions of the cylindrical lens portions are mutually shifted by a half of the cycle (pitch) thereof, are arranged alternately and repeatedly in the vertical direction.

Figure 24:
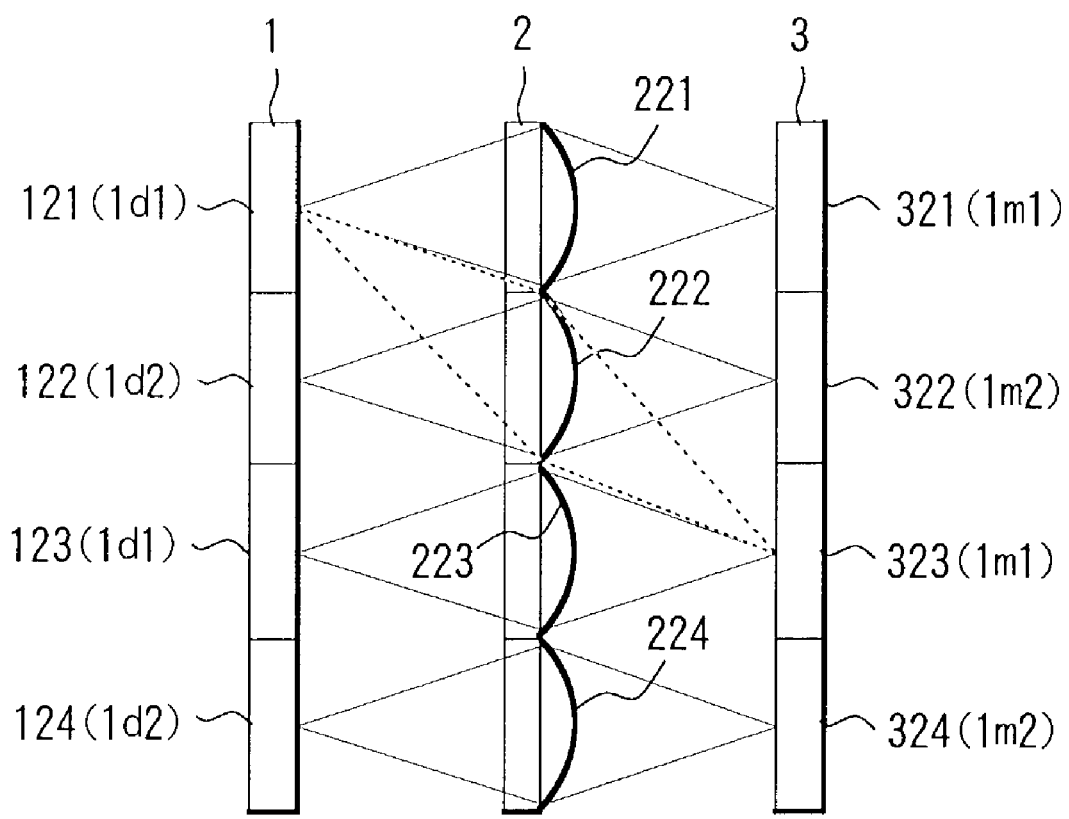
FIG. 24 is a vertical section of the stereoscopic image display apparatus according to embodiment 6.

FIG. 24 is a vertical sectional view for explaining the optical action of the horizontal lenticular lens 2 in this embodiment. Each of cylindrical lens portions constituting the horizontal lenticular lens 2 corresponds to one horizontal pixel line, and rays of light from the horizontal pixel line are formed images in the vertical direction on one corresponding horizontal lens line by the cylindrical lens portion.

In FIG. 24, a horizontal pixel line 121 and a horizontal lens line 321 of the shift lenticular array 3 corresponds to a cylindrical lens portion 221 constituting the horizontal lenticular lens 2, and the cylindrical lens portion 221 makes rays of light from the horizontal pixel line 121 form images in the vertical direction on the horizontal lens line 321 of the shift lenticular array 3.

In FIG. 24, horizontal pixel lines having the same pixel arrangement pattern on the display unit 1 and a horizontal lens line having the same lens arrangement pattern are arranged every other line respectively, and similarly to the relation explained in Embodiment 1, they are arranged with associating a ratio of distance (Lv1) between a plane where pixels are arranged on the display unit 1 and the horizontal lenticular lens 2, and distance (Lv2) between the horizontal lenticular lens 2 and shift lenticular lens 3, with a ratio of the width of the horizontal pixel line Vd to that Vm of the horizontal lens line. Therefore, rays of light emerged from the horizontal pixel line 121 and incident on a cylindrical lens portion 222, which does not correspond originally to the horizontal pixel line 121 are formed images in the vertical direction on the horizontal lens line 323 in the shift lenticular array 3 by an optical action of the cylindrical lens portion 222.

In consequence, since the horizontal lens line 323 has the lens arrangement pattern of lm1, the rays of light emerge d from the horizontal pixel line 121 and incident on both cylindrical lens portions 221 and 222 are incident on the horizontal lens line lm1 in the shift lenticular array 3 that correspond to the horizontal pixel line ld1 to reach predetermined viewpoints.

Similarly, even if rays of light from respective horizontal pixel lines are incident on any cylindrical lens portions constituting the horizontal lenticular lens 2, the rays of light are formed images in the vertical direction on the horizontal lens lines (lm1 and lm2) in the shift lenticular array 3 that correspond to the arrangement patterns of viewpoint images in the horizontal pixel lines (ld1 and ld2). Hence, the stereoscopic image display is normally performed without mutually mixing viewpoint images.

As above described, it is possible to accurately perform the association of optical paths from the respective horizontal pixel lines of the display unit 1 to the corresponding horizontal lens lines of the shift lenticular array 3 by making each cylindrical lens portion, constituting the horizontal lenticular lens 3, correspond to one horizontal pixel line. Hence, it becomes possible to effectively prevent the mixing of viewpoint images, and it is possible to reduce color separation generated when color display is performed.

Embodiment 7

In each of other embodiments described above, the horizontal lenticular lens 2 is placed in front of the display unit 1. But, in this embodiment, structure will be described, the structure in which the horizontal lenticular lens 2 is arranged between a display unit 1 that is a transmissive LCD or the like, and a light source panel that illuminates the display unit 1 from the back side thereof.

Figure 25:
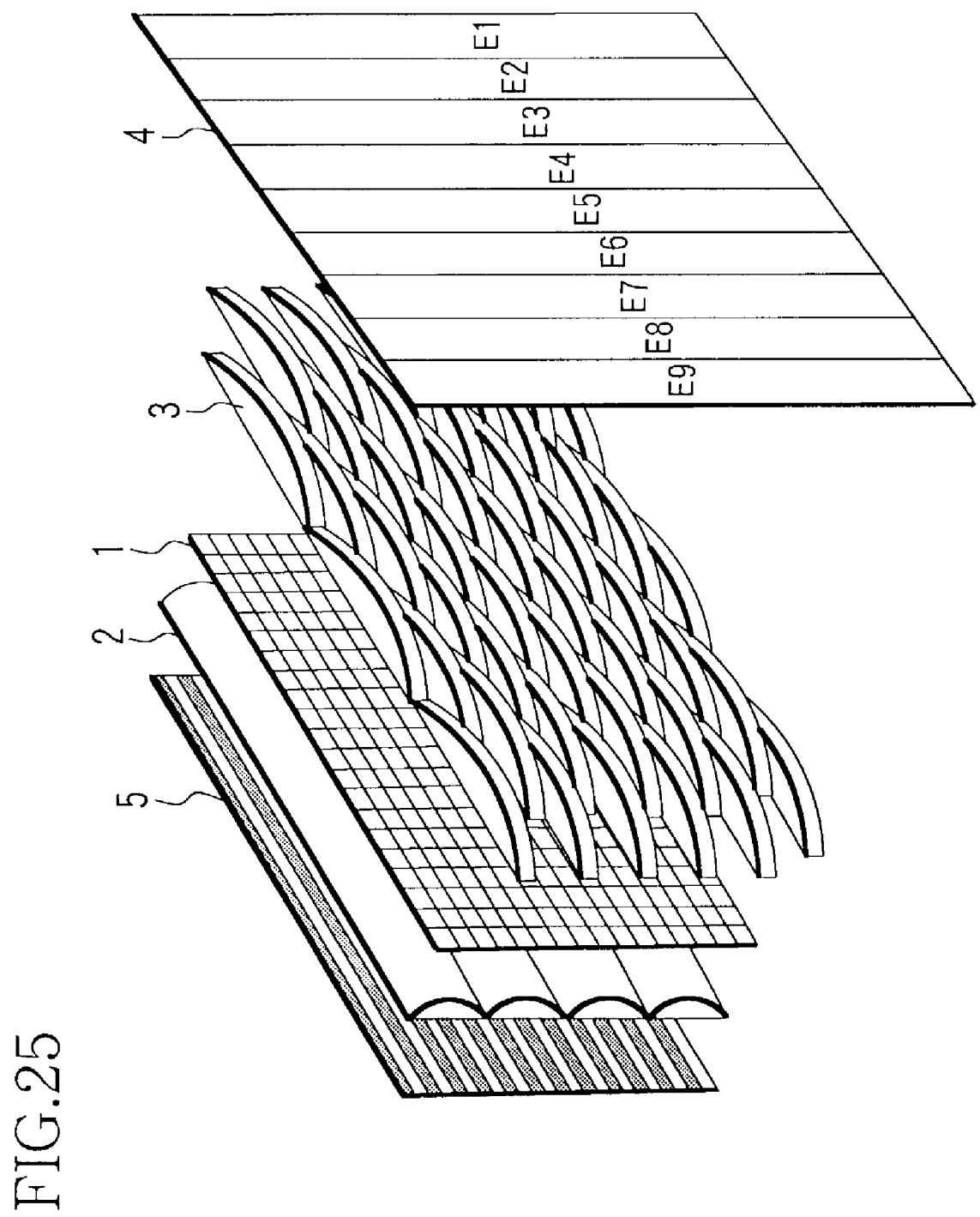
FIG. 25 is a perspective view showing the structure of a stereoscopic image display apparatus that is Embodiment 7 of the present invention.

FIG. 25 is a perspective view showing the structure of a stereoscopic image display apparatus that is Embodiment 7 of the present invention. In this embodiment, a transmissive LCD is used as the display unit 1, and the light source panel 5 is arranged in the rear of the LCD. In addition, the horizontal lenticular lens 2 is arranged between the display unit 1 and light source panel 5, and the shift lenticular array 3 is arranged in front of the display unit 1.

Figure 26:
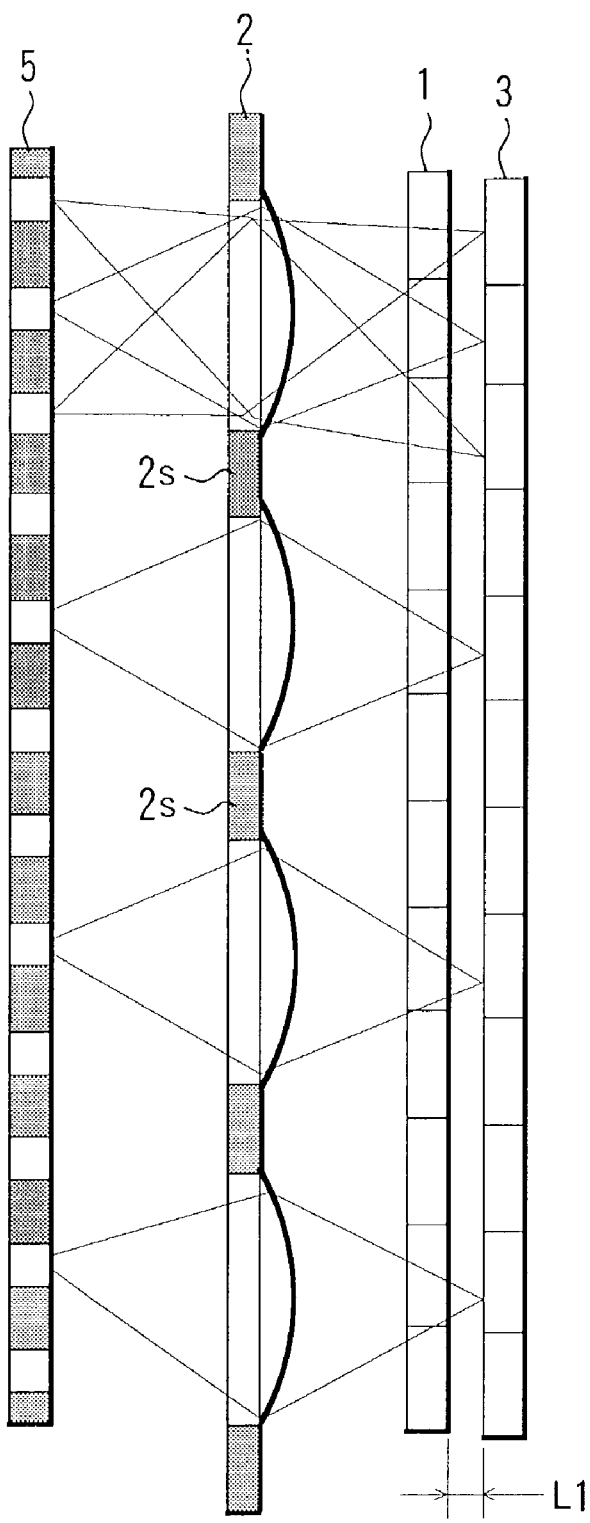
FIG. 26 is a vertical section of the stereoscopic image display apparatus according to Embodiment 7.

FIG. 26 is a vertical section of the apparatus according to this embodiment. FIG. 26 shows the relation among respective components in the case that pixels in the display unit 1 are arranged so that three horizontal pixel lines (p=3) makes one cycle. As shown in FIG. 26, the display unit 1 is arranged adjacently to the shift lenticular array 3. In addition, each of the cylindrical lens portions constituting the horizontal lenticular lens 2 is constituted so as to make illumination light from the light source panel 5 transmit a corresponding horizontal pixel line on the display unit 1, and substantially are formed images on each horizontal lens line of the shift lenticular array 3.

Such structure makes it possible that rays of display light from each horizontal pixel line on the display unit 1 are incident on one horizontal line of the shift lenticular array 3 corresponding to the horizontal pixel line even if a transmissive LCD is used as the display unit 1, and rays of light from a pixel corresponding to each viewpoint on the display unit 1 are led to a corresponding viewpoint similarly to Embodiment 1.

In the structure of this embodiment, there is a possibility that the illumination light from the light source panel 5 illuminates upper and lower horizontal pixel lines as well as a corresponding horizontal pixel line, depending on design conditions such as a space between the light source panel 5 and display unit 1, and a space between the display unit 1 and shift lenticular array 3. Since crosstalk in the vertical direction arises when illumination light from the light source panel 5 illuminates a horizontal pixel line, which does not correspond originally, in this manner, excellent stereoscopic vision becomes difficult.

In order to prevent such crosstalk, it is effective to make the light source panel 5 have light source lines extending in the horizontal direction and corresponding to respective horizontal pixel lines of the display unit 1, or to narrow an effective aperture of each cylindrical lens portion constituting the horizontal cylindrical lens 2 and fill other portions with light-shielding members. FIG. 26 shows the case of using the light source panel 5 that has light source lines extending horizontally and corresponding to respective horizontal pixel lines of the display unit 1, and the horizontal cylindrical lens 2 that has light-shielding members 2s between cylindrical lens portions.

In the structure of this embodiment, since the horizontal lenticular lens 2 is not arranged between the display unit 1 and shift lenticular lens 3 in comparison with the structure of Embodiment 1, it is possible to narrow the space L1 between the display 1 and shift lenticular lens 3. In addition, as it is obvious from the relational expression (hl) described in Embodiment 1, there is the relation of Hd:He=L1:L0, where horizontal pixel width is Hd, observation width of each viewpoint (an observation area 4) is He, and observation distance is L0. Therefore, when observation is performed at the observation distance L0 by using a display unit with predetermined horizontal pixel width Hd, it is possible to narrow the space L1 between the display unit 1 and shift lenticular lens 3, and hence, it is possible to widen the width He of each viewpoint.

FIG. 27 shows the arrangement of pixels corresponding to respective viewpoints on the display unit 1 used in this embodiment. FIG. 27 shows the pixel arrangement corresponding to nine viewpoints (=3×3) similarly to Embodiment 1 as an example of pixel arrangement. Since the horizontal lenticular lens 2 is not arranged between the display unit 1 and shift lenticular lens 3 in this Embodiment differently from Embodiment 1, it does not arise to vertically exchange positions between a horizontal pixel line on the display unit 1 corresponding to each of lenticular lens portions constituting the horizontal lenticular lens 2, and a horizontal pixel line that an observer observes. Therefore, pixel arrangement on the display unit 1 used in this embodiment differs from the arrangement shown in FIG. 2 showing Embodiment 1 to become arrangement shown in FIG. 27.

As above explained, according to each of the above-described embodiments, it is possible to freely select an image display unit. In addition, it is possible to provide a multiviewpoint stereoscopic image display apparatus, in which crosstalk hardly arises even if a transmissive image display unit with strong scattering is used, and whose light efficiency is high.

Furthermore, it is possible to suppress color separation when performing color display by constituting an image display unit of c types of pixels that emerge c colors of light that is different mutually and making p an integral multiple of c without making q an integral multiple of c.

Moreover, since the shift lenticular array 3 and diagonal lenticular array sheet 203 are used for light separation in the horizontal direction in the above-described embodiments, there are no mask etc. that shield the light emerged from the display unit 1. Therefore, light efficiency is higher than that of a conventional stereoscopic image display apparatus that uses a mask. Hence, it is possible to display a stereoscopic image that is bright in high resolution, and can be observed from multiple viewpoints.

In addition, though the cases of using the shift lenticular array 3 and diagonal lenticular array sheet 203 for the light separation in the horizontal direction are described in the above-described embodiments, it is also good to use an optical element having optical acting portions whose optical action is equal to a lens owing to the structure of diffractive gratings as a lenticular array in present invention.

Furthermore, though the case that the horizontal lenticular lens 2 as a limiting member and the shift lenticular array 3 (or, diagonal lenticular array sheet 203) as a lenticular array are separated in each of the above-described embodiments, these can be integrated when both are adjacently arranged. For example, it is also good to perform integration by joining an optical member (limiting member), formed by making lens surfaces having optical actions equal to the horizontal lenticular lens 2 facing a display unit side, with the shift lenticular array 3 in each of the above-described embodiments. Alternatively, it is also good to produce an integrally produced member by forming lens surfaces having optical actions equal to the horizontal lenticular lens 2, in a display unit side and a plurality of lens portions of the shift lenticular array 3 in each of the above-described embodiments, in an observation area side. Though it is required in the present invention to align pixels of an image display unit, a liming member, and a lenticular array in high accuracy, it is possible to easily align them by integrating the limiting member and lenticular array as above described.

In addition, it is possible to also apply this to a stereoscopic image display apparatus with the number of viewpoints other than the numbers of viewpoints explained in the above-described respective embodiments. For example, though it is desirable to have the number of viewpoints that is four or more, it is possible to also apply this to those with the numbers of viewpoints that are two and three.

While preferred embodiments have been described, it is to be understood that modification and variation of the present invention may be made without departing from the sprit or scope of the following claims.

What is claimed is:

1. A stereoscopic image display apparatus, comprising:
an image display unit in which a plurality of horizontal pixel lines are provided in a vertical direction, and pixel groups comprising pixels that display images corresponding to a plurality of observation positions respectively are arranged cyclically;
a lenticular array which substantially condenses rays of light from the respective pixels at the predetermined observation positions in a horizontal plane, and which comprises a plurality of horizontal lens lines arranged in the vertical direction, each horizontal lens line comprises a plurality of cylindrical lenses arranged in the horizontal direction at a predetermined cycle corresponding to each of the pixel groups; and
a limiting member that limits rays of light so that rays of light from each predetermined horizontal pixel line reaches the horizontal lens lines having the cylindrical lenses whose horizontal positions are the same among the plurality of horizontal lens lines,
wherein rays of light from the pixels that display images corresponding to the respective observation positions reach predetermined observation positions through the lenticular array and the limiting member.

2. A stereoscopic image display apparatus according to claim 1, wherein the pixel groups are formed by horizontally arranging the pixels displaying the images corresponding to the plurality of observation positions respectively, each of the horizontal pixel lines includes the plurality of horizontal pixel groups and a plurality of the horizontal pixel lines is provided in the vertical direction so that the pixel groups are shifted horizontally among the pixel lines; and
wherein each of the cylindrical lenses corresponds to each of the pixel groups in the lenticular array.

3. The stereoscopic image display apparatus according to claim 2, wherein the image display unit has c types of pixels that emerge c colors of light fluxes that are different mutually, and are arranged horizontally, and a number of the observation positions is not an integral multiple of the c.

4. The stereoscopic image display apparatus according to any one of claim 1, wherein each of the pixel groups is formed in a q·p matrix-like group by horizontally arranging q pixels and vertically arranging p pixels, the pixels in each pixel groups display images corresponding to the plurality of observation positions respectively, and furthermore, the pixel groups are arranged in the horizontal and vertical direction in a matrix-like pattern; and
wherein p cylindrical lenses are provided so as to correspond to each of the pixel groups in the vertical direction in the lenticular array.

5. The stereoscopic image display apparatus according to claim 4, wherein the image display unit has c types of pixels that emerge rays of c colors that are different mutually, and are arranged in the horizontal direction, and the number q of the pixels in the horizontal direction is not an integral multiple of the c.

6. The stereoscopic image display apparatus according to any one of claim 1, wherein the limiting member is an optical member in which a plurality of cylindrical lenses provided so as to have an optical power in the vertical direction and are arranged in the vertical direction.

7. A stereoscopic image display system, comprising: the stereoscopic image display apparatus according to any one of claim 1; and
an image information supplying apparatus that supplies image information, displayed in the image display unit, to the stereoscopic image display apparatus.

8. A stereoscopic image display apparatus, comprising
an image display unit comprising a transmissive image display unit in which a plurality of horizontal pixel lines are provided vertically in a vertical direction, and pixel groups comprising pixels that display images corresponding to a plurality of observation positions respectively are arranged cyclically;
a light source being placed in the back of the image display unit and illuminating the image display unit;
a lenticular array which substantially condenses rays of light, passing through predetermined pixels in the image display unit among rays of light from the light source, at the predetermined observation positions in a horizontal plane, and which comprises a plurality of horizontal lens lines arranged in the vertical direction, each horizontal lens line comprises a plurality of cylindrical lenses arranged in a horizontal direction at a predetermined cycle corresponding to each of the pixel groups; and a limiting member that limits rays of light from the light source so that rays of light pass through a predetermined horizontal pixel line and reach the horizontal lens lines having the cylindrical lenses whose horizontal positions are the same among the plurality of horizontal lens lines, wherein rays of light from the pixels that display images corresponding to the respective observation positions reach predetermined observation positions through the lenticular array and the limiting member.

9. The stereoscopic image display apparatus according to claim 8, wherein the pixel groups are formed by horizontally arranging the pixels displaying the images corresponding to the plurality of observation positions respectively, each of the horizontal pixel lines includes the plurality of horizontal pixel groups and a plurality of the horizontal pixel lines is provided in the vertical direction so that the pixel groups are shifted horizontally among the pixel lines; and wherein each of the cylindrical lenses corresponds to each of the pixel groups in the lenticular array.

10. The stereoscopic image display apparatus according to claim 8, wherein each of the pixel groups is formed in a q·p matrix-like group by horizontally arranging q pixels and vertically arranging p pixels, the pixels in each pixel groups display images corresponding to the plurality of observation positions respectively and furthermore, the pixel groups are arranged in the horizontal and vertical direction in a matrix-like pattern; and wherein p cylindrical lenses are provided so as to correspond to each of the pixel groups in the vertical direction in the lenticular array.

11. The stereoscopic image display apparatus according to claim 8, wherein the limiting member is an optical member in which a plurality of cylindrical lenses provided so as to have an optical power in the vertical direction and are arranged in the vertical direction.

12. A stereoscopic image display system, comprising:

the stereoscopic image display apparatus according to any one of claim 8; and an image information supplying apparatus that supplies image information, displayed in the image display unit, to the stereoscopic image display apparatus.

* * * * *